(12) United States Patent
Jung

(10) Patent No.: US 7,152,709 B2
(45) Date of Patent: Dec. 26, 2006

(54) INDUSTRIAL VEHICLE

(75) Inventor: Jun Mo Jung, Kyungki-do (KR)

(73) Assignee: Hyo Chun Co., Ltd., Kyungki-Do (KR)

( * ) Notice: Subject to any disclaimer, the term of this patent is extended or adjusted under 35 U.S.C. 154(b) by 113 days.

(21) Appl. No.: 10/964,997

(22) Filed: Oct. 14, 2004

(65) Prior Publication Data

US 2005/0133294 A1 Jun. 23, 2005

(30) Foreign Application Priority Data

Dec. 23, 2003 (KR) ............. 10-2003-0095798
Dec. 23, 2003 (KR) ............. 10-2003-0095799
Dec. 23, 2003 (KR) ............. 10-2003-0095800

(51) Int. Cl.
  *B62D 5/06* (2006.01)
  *B62D 7/06* (2006.01)
  *B66F 9/00* (2006.01)

(52) U.S. Cl. ........................ 180/414; 414/686
(58) Field of Classification Search ............... 180/414, 180/425; 414/685, 686
See application file for complete search history.

(56) References Cited

U.S. PATENT DOCUMENTS

| 2,774,434 | A | | 12/1956 | Ferris | |
|---|---|---|---|---|---|
| 3,593,867 | A | * | 7/1971 | Moe | 414/728 |
| 4,504,074 | A | * | 3/1985 | Smith | 280/93.513 |
| 5,169,278 | A | | 12/1992 | Hoechst et al. | |
| 5,899,292 | A | * | 5/1999 | Paul et al. | 180/419 |
| 5,947,516 | A | | 9/1999 | Ishikawa | |
| 6,641,355 | B1 | * | 11/2003 | McInerney et al. | 414/685 |
| 6,820,714 | B1 | * | 11/2004 | Schymczyk et al. | 180/442 |

FOREIGN PATENT DOCUMENTS

| DE | 72 42 521 | 7/1973 |
|---|---|---|
| GB | 1 158 621 | 7/1969 |
| GB | 1 238 482 | 7/1971 |
| KR | 1995-0004310 | 7/1993 |
| KR | 1998-045500 | 9/1998 |
| KR | 1999-0041376 | 12/1999 |
| KR | 2001-0063039 | 7/2001 |

OTHER PUBLICATIONS

English Translation of Title and Claim 1 of KR 1995-0004310 dated Jul. 20, 1993.
English Translation of Title and Abstract of KR 1998-045500 dated Sep. 25, 1998.
English Translation of Title and Abstract of KR 1999-0041376 dated Dec. 15, 1999.
English Translation of Title and Abstract of KR 2001-0063039 dated Jul. 9, 2001.

* cited by examiner

*Primary Examiner*—Lesley D. Morris
*Assistant Examiner*—Marc A. Scharich
(74) *Attorney, Agent, or Firm*—Ladas and Parry LLP

(57) ABSTRACT

A steering system for steering front and rear wheels of an industrial vehicle has an upper frame rotatably coupled on an upper side of a lower frame, a steering system rotating the front and rear wheels in a predetermined direction as a steering wheel is rotated, a differential driving unit mounted to each of the wheels and differentially driving the left wheel and the right wheel according to a load applied to the wheels, a boom assembly having a boom length adjuster, and an upper frame pivoting unit provided between the lower and upper frames and rotating the upper frame in relation to the lower frame.

13 Claims, 19 Drawing Sheets

INDUSTRIAL VEHICLE

CROSS-REFERENCE TO RELATED APPLICATIONS

This application claims benefit under 35 U.S.C. § 119 from Korean Patent Application No. 2003-95798 filed on Dec. 23, 2003, No. 2003-95799 filed on Dec. 23, 2003 and No. 2003-95800 filed on Dec. 23, 2003, the entire content of which is incorporated herein by reference.

BACKGROUND OF THE INVENTION

1. Field of the Invention

The present invention generally relates to an industrial vehicle and more particularly, to an industrial vehicle, in which a steering system for steering front and rear wheels in the same direction without restriction to a steering angle and a simply configured differential driving unit are provided, so that a progress direction of the vehicle can be easily changed, and in which a working tool horizontal adjuster and a boom length adjuster are mounted to a boom assembly, and a pivoting unit of an upper frame is mounted to the vehicle, and a leading end of a working tool moves has a motion locus moving along a substantially vertical linear path and in the mean time a boom length is adjusted, so that a loading position of an object can be freely selected.

2. Description of the Related Art

In general, an industrial vehicle is a vehicle used either to transfer powdered materials such as soils or sands or to load objects at an elevated place, which designates heavy equipment such as a skid steer loader, a forklift, etc.

According to this industrial vehicle, front and rear wheels are installed in front and rear of a vehicular body frame. A boom assembly where a working tool such as a bucket or a forked platform is mounted is installed over the vehicular body frame. The boom assembly moves up and down with respect to the vehicular body frame to perform an unloading work.

FIG. 1 is a schematic view showing a working state of a conventional industrial vehicle.

In order for an industrial vehicle 11 to transfer an object 10 from an old place C where the object is originally placed to a new place E, the following work sequence is performed. The object 10 is loaded on a working tool 12 of the vehicle 11 in the old place C. The vehicle 11 is reversed in a direction of a place D and progressed toward the place E. Then, the object 10 is unloaded. Therefore, unnecessary manipulations such as a progressing motion, a reversing motion, etc. of the vehicle are required, thus increasing a working time.

Further, when the conventional industrial vehicle performs the unloading work, a sufficient space where the vehicle can rotate must be secured. However, such a space is not often secured in various industrial sites and warehouses of stores, etc. As shown, when a wall 13 is present in the place D, the vehicle 11 can not reverse in the direction of the place D, so that works, for example, of transferring the object 10 can not be performed. Therefore, it is strongly required that the industrial vehicle can smoothly work in the narrow space.

A four wheel steering system is employed to the steering system of the industrial vehicle in order to efficiently perform works in the narrow space. The four wheel steering system has an advantage in that the vehicle can rotate at a small radius in the narrow space, unlike the two wheel steering system where only the front or rear wheels are steered.

Technologies on the four wheel steering system are disclosed in Korean Utility Model Publication Nos. 1999-41376 and 1998-45500, in which front wheels are steered in the opposite direction to rear wheels. According to this conventional four wheel steering system, front and rear axles to whose opposite ends the front and rear wheels are mounted are installed in front and rear of a vehicular body. Front and rear steering cylinders are installed to be apart from the front and rear axles at a predetermined interval. Tie rods and knuckle arms are coupled on both sides of the front and rear steering cylinders. As a result, as hydraulic pressure is applied to the steering cylinders, the front and rear wheels are steered left and right.

In spite of this configuration, a steering angle of the wheels is limited to a movement distance of the steering cylinder. Thus, in order to change the progress direction of the vehicle, a rotational space sufficient to progress and reverse the vehicle is required. For this reason, there is a problem in that the work is restricted in the narrow space.

Further, technology capable of easily parking a vehicle in a narrow space is disclosed in Korean Patent Registration No. 4310, in which each wheel can be rotated at an angle of 360° in an arbitrary direction by independent operation. Specifically, two warm gears driven by two stepping motors respectively are installed upside wheels. Warms are engaged between the warm gears. The warms are fixed to steering shafts of the wheels, so that each wheel is independently steered. However, in order to steer each wheel, many components such as stepping motors, gear trains, etc. are required to thus cause a complicated configuration. Consequently, there is a problem in that production costs are increased.

Further, in the conventional industrial vehicle, in order to efficiently operate the vehicle, a differential driving unit for differentially driving left and right wheels is mounted. Most differential driving units have a complicated configuration, so that the number of components is increased together with production costs.

In an initial industrial vehicle, a main arm of a boom assembly is rotatably coupled to a single rotational shaft on a vehicular body frame so as to go up and down in a vertical direction. However, there is a problem in that a leading end of a working tool mounted on a front end of the main arm moves in a bow form.

To be specific, in an early stage where the boom assembly begins to go up, the leading end of the working tool moves forward a vehicular body. After the boom assembly passes through a middle point, the leading end of the working tool moves backward. Thus, there is a problem in that a reach, a distance up to the leading end of the working tool, is decreased when the boom assembly goes up at the highest point.

Therefore, when objects are unloaded on a truck using the industrial vehicle, the industrial vehicle must be operated apart from the truck so as to prevent the working tool from collide with the truck in an initial operation period of the working tool. At a moment when the object is unloaded, a series of manipulations, for example, where the industrial vehicle is progressed at a predetermined interval with the working tool located to be sufficiently higher than an upper portion of a rear end of the truck, must be performed. Further, while the boom assembly goes up, the working tool moves forward at a predetermined distance in relation to the vehicular body. For this reason, in a state where the heavy object is loaded on the working tool, there is a danger that a center of gravity of the vehicle moves forward, and thus the vehicle is upset.

As technologies for solving the foregoing problems in the prior art, an industrial vehicle designed so that a leading end of a working tool moves along a linear path in a substantially vertical direction when a boom assembly goes up is disclosed in Korean Patent Publication No. 2001-63039 and U.S. Pat. No. 5,169,278.

According to these technologies, in an early stage where a boom assembly begins to go up, a working tool also goes up in a substantially vertical direction. For this reason, in order for the working tool to avoid colliding with a rear end of, for example, a truck on which objects are loaded, a series manipulations, for example, of reversing an industrial vehicle are not needed. There is no phenomenon that a reach of the boom assembly is greatly varied in forward and backward directions of the industrial vehicle.

However, because the working tool moves in a direction perpendicular to a vehicular body, when the objects are stacked at the innermost portion of the truck or a container, there is a difficulty that the industrial vehicle must move up to the interior of the truck or the container to unload the objects and reverse again.

Therefore, there is a strong demand for technology that a length of the boom assembly of the industrial vehicle can be adjusted and thereby a position of the working tool unloading the objects can be adjusted in the forward and backward directions.

Further, in the conventional industrial vehicle, when the boom assembly goes up and down, a driver or operator must manually manipulate a control lever to horizontally maintain the working tool. Hence, both proficiency capable of manipulating a main arm and the control lever of the working tool and caution are required. Sometimes, it happens that it is difficult to horizontally maintain the working tool to drop the objects. For these reasons, working efficiency is lowered and a danger of safety accident is always present.

Further, in view of nature of a work performed in the narrow space, there is a case that an old place where the objects are originally placed is close to a new place where the objects are to be newly stacked. In this case, when the objects are unloaded using the industrial vehicle, the industrial vehicle must be reversed, rotated, and progressed with the objects loaded on the working tool, and thereby the front of the industrial vehicle must face the new place.

In order to perform the works in the narrow space, the industrial vehicle is designed to have a minimum rotational radius. However, many working environments are so narrow that rotation of the industrial vehicle having a small rotational radius can not be allowed. Therefore, there is a strong demand for technology capable of changing only a direction of the industrial vehicle without rotating the entire industrial vehicle.

SUMMARY OF THE INVENTION

Therefore, the present invention is to make it possible to easily change a progress direction of an industrial vehicle by mounting a steering system having a driving chain and a sprocket which are driven by a steering cylinder to thereby steer front and rear wheels in the same direction without any restriction to a steering angle.

It is another objective to make it possible to freely select a stacked position of an object by mounting a boom length adjuster to thereby adjust a boom length by means of a leading end of a working tool which moves along a linear path in a substantially vertical direction.

It is yet another objective to make it possible for differential driving functions of left and right wheels to be efficiently performed by mounting a differential driving unit, which the left and right wheels are differentially driven by a simple configuration, to an industrial vehicle.

It is yet another objective to make it possible for a working tool to be automatically adjusted by mounting a working tool horizontal adjuster to a boom assembly of an industrial vehicle when a boom assembly goes up or down to thereby improve working efficiency and safety.

It is yet still another objective to make it possible to change a direction of a working tool without rotating an entire industrial vehicle by providing a pivoting unit of an upper frame rotating the upper frame in relation to a lower frame, to thereby provide the industrial vehicle suitable for a narrow working environment.

In order to accomplish these objectives, the present invention provides an industrial vehicle having a steering system for steering front and rear wheels in the same direction without any restriction to a steering angle, a differential driving unit, a boom assembly including a working tool horizontal adjuster and a boom length adjuster, and an upper frame pivoting unit.

According to one aspect of the present invention, the industrial vehicle comprises a lower frame on front and rear lower sides of which front and rear wheels are installed respectively, the front and rear wheels being composed of left and right wheels; an upper frame having a cab with a steering wheel located on an upper portion thereof and coupled upside the lower frame; steering cylinders, each provided with left and right input ports, having a driving chain connected on both ends thereof, and moving the driving chain left and right by means of a pressure oil supplied to the left and right input ports; left and right sprockets driven by the driving chain; front and rear wheel steering cases having left and right pivoting shafts, the left and right pivoting shafts being coupled to the left and right sprockets on upper portions thereof and to the left and right wheels on lower portions thereof to transmit driving force to the left and right wheels; a rotary valve connected to a steering pump and a hydraulic tank, provided with left and right output ports and discharging pressure oil from the steering pump to the left and right input ports based on rotation of the steering wheel; and a plurality of fluid channels connected between the left and right output ports of the rotary valve and the left and right input ports of the front and rear wheel steering cases or between the left and right input ports of the front and rear wheel steering cases.

The plurality of fluid channels include: when the steering cylinders are provided on inner sides in relation to the left and right pivoting shafts in the steering cases and when the front and rear wheel steering cases are symmetrically provided, a first fluid channel having a right fluid channel connecting the right input port of the front steering case and the left input port of the rear wheel steering case and a left fluid channel connecting a left input port of a hydraulic cylinder of the front wheel steering case and the right input port of the rear wheel steering case; a second fluid channel connecting the right output port of the rotary valve and the right fluid channel; and a third fluid channel connecting the left output port of the rotary valve and the left fluid channel.

The plurality of fluid channels include: when the steering cylinder is provided on inner sides in relation to the left and right pivoting shafts in the steering cases and when the front and rear wheel steering cases are symmetrically provided, a first fluid channel connecting one input port of the front steering case and one input port of the rear wheel steering case; a second fluid channel connecting one output port of the rotary valve and the other input port of the front wheel steering case; and a third fluid channel connecting the other output port of the rotary valve and the one input port of the rear wheel steering case.

The industrial vehicle further comprises at least one solenoid valve for opening/closing a flow of the pressure oil from the rotary valve to the front and rear wheel steering cases.

The industrial vehicle further comprises a differential driving unit which is mounted to each wheel and has a driving hydraulic motor which differentially drives the left wheel and right wheel according to a load applied to the wheels.

The differential driving unit includes: left and right wheels installed on left and right of the wheels; left and right driving hydraulic motors connected in parallel to the driving pump and driving the left and right wheels; and a gear case mounted a reduction gear train connecting the left and right wheels and the left and right driving hydraulic motors and coupled to the pivoting shafts, wherein a flow rate distributed from the driving pump to the left and right driving hydraulic motors according to a load applied to the left and right wheels to differentially drive the left and right wheels.

The industrial vehicle further comprises an upper frame pivoting unit provided between the upper frame and the lower frame and rotating the upper frame in relation to the lower frame.

According to another aspect of the present invention, the industrial vehicle comprises a lower frame on front and rear lower sides of which front and rear wheels are installed respectively, the front and rear wheels being composed of left and right wheels; an upper frame having a cab with a steering wheel located on an upper portion thereof and coupled upside the lower frame; steering cylinders, each provided with left and right input ports, having a driving chain connected on both ends thereof, and moving the driving chain left and right by means of a pressure oil supplied to the left and right input ports; left and right sprockets driven by the driving chain; front and rear wheel steering cases having left and right pivoting shafts, the left and right pivoting shafts being coupled to the left and right sprockets on upper portions thereof and to the left and right wheels on lower portions thereof to transmit driving force to the left and right wheels; a rotary valve connected to a steering pump and a hydraulic tank, provided with left and right output ports and discharging pressure oil from the steering pump to the left and right input ports based on rotation of the steering wheel; a plurality of fluid channels connected between the left and right output ports of the rotary valve and the left and right input ports of the front and rear wheel steering cases or between the left and right input ports of the front and rear wheel steering cases; a solenoid valve for opening/closing a flow of the pressure oil from the rotary valve to the rear wheel steering case; an upper frame pivoting unit provided between the upper frame and the lower frame and rotating the upper frame in relation to the lower frame; and a direction switching valve provided between the rotary valve and the front wheel steering case so as to move the wheels in the same direction as a rotational direction of the steering wheel when the upper frame is pivoted about the pivoting unit in relation to the lower frame to be aligned in a direction opposite to the lower frame and then the steering wheel is rotated, and switching a direction of the pressure oil discharged from the left and right output ports of the rotary valve to the left and right input ports of the front wheel steering case.

The plurality of fluid channels include: when the steering cylinders are provided on inner sides in relation to the left and right pivoting shafts in the steering cases and when the front and rear wheel steering cases are symmetrically provided, a first fluid channel having a right fluid channel connecting the right input port of the front steering case and the left input port of the rear wheel steering case and a left fluid channel connecting a left input port of a hydraulic cylinder of the front wheel steering case and the right input port of the rear wheel steering case; a second fluid channel connecting the right output port of the rotary valve and the right fluid channel; and a third fluid channel connecting the left output port of the rotary valve and the left fluid channel.

According to yet another aspect of the present invention, the industrial vehicle having front and rear wheels in lower front and rear of a vehicular body frame and provided with a boom assembly with a working tool on an upper side of the vehicular body frame, the industrial vehicle comprising: a rear arm having a rear end fixed pivotably in rear of the upper frame; a first main arm having a rear end fixed pivotably on a front end of the rear arm; a second main arm slidably coupled on a front end of the first main arm and having a working tool bracket and the working tool fixed rotatably on a front end thereof; a boom length adjuster provided between the first and second main arms and moving the second main arm in relation to the first main arm; a lifting actuator pivotably fixed to the upper frame in front of the rear arm on one end thereof and rotatably fixed in a middle portion of the first main arm on the other end thereof, to thus be telescoped to pivot the first main arm; a control link pivotably fixed in front of the upper frame on one end thereof and rotatably fixed to the first main arm on the other end thereof; and a working tool actuator fixed to the second main arm on one end thereof and pivotably fixed to the working tool bracket to rotate the working tool bracket.

The boom assembly further comprises a working tool horizontal adjuster having a control valve for controlling a flow rate so that the working tool actuator is operated as the lifting actuator is operated.

The boom length adjuster includes: a chamber provided on an inner side of the front end of the first main arm in a longitudinal direction; a first flange provided on an outer circumferential edge on the front end of the first main arm; a telescopic actuator having a rear end fixed in the chamber and the other end fixed on a rear end of the second main arm, and provided in the chamber to move the second main arm inserted into the chamber; and a second flange provided outside the second main arm so as to come into contact with the first flange with the telescopic actuator contracted.

BRIEF DESCRIPTION OF THE DRAWINGS

The above aspects and features of the present invention will be more apparent by describing certain embodiments of the present invention with reference to the accompanying drawings, in which.

DETAILED DESCRIPTION OF THE PREFERRED EMBODIMENTS

Hereinafter, a configuration and operation of an industrial vehicle according to the present invention will be described in more detail through exemplary embodiments of accompanying drawings.

Figure 1:
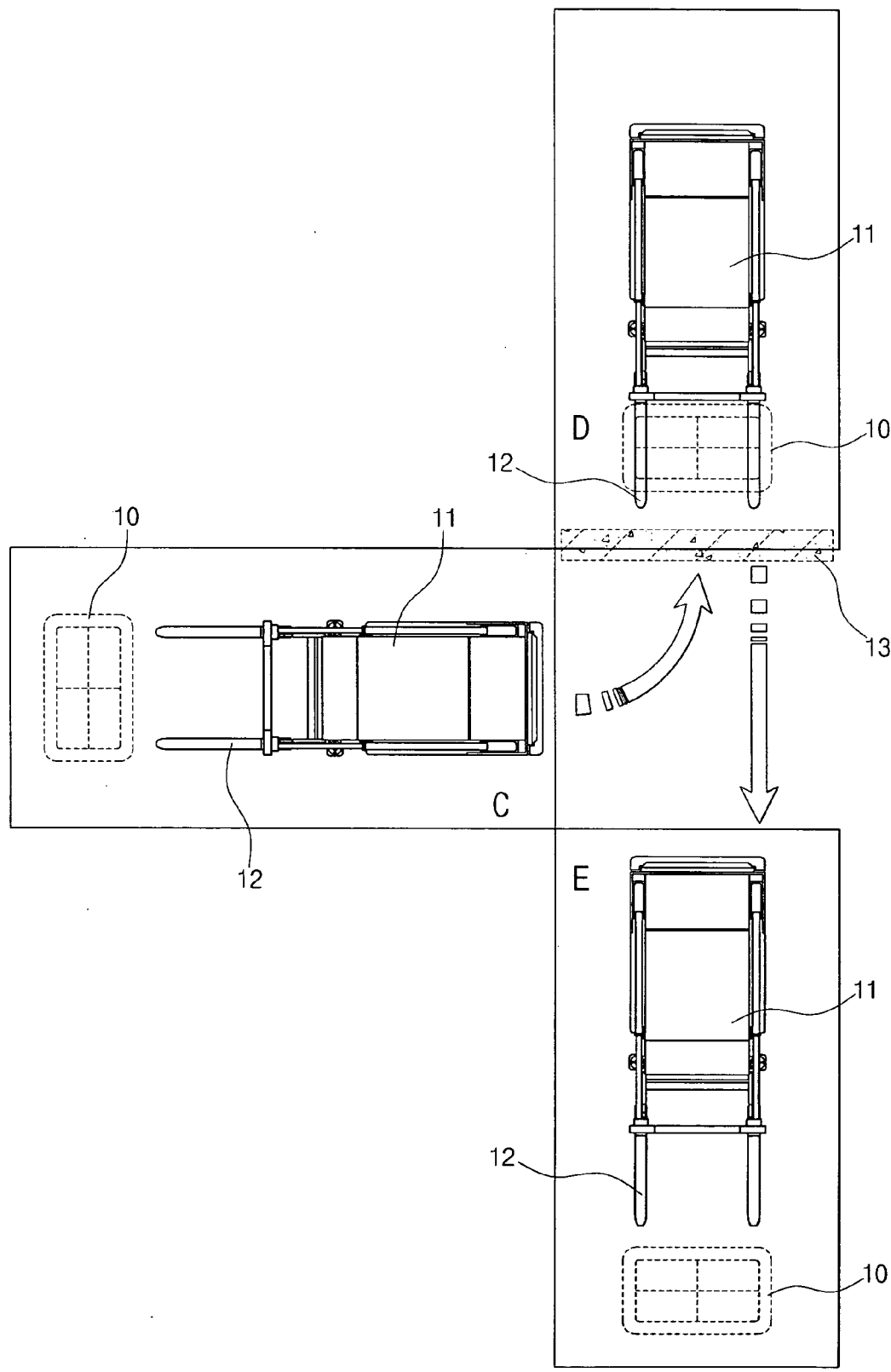
FIG. 1 is a schematic view showing a working state of a conventional industrial vehicle.
Figure 2:
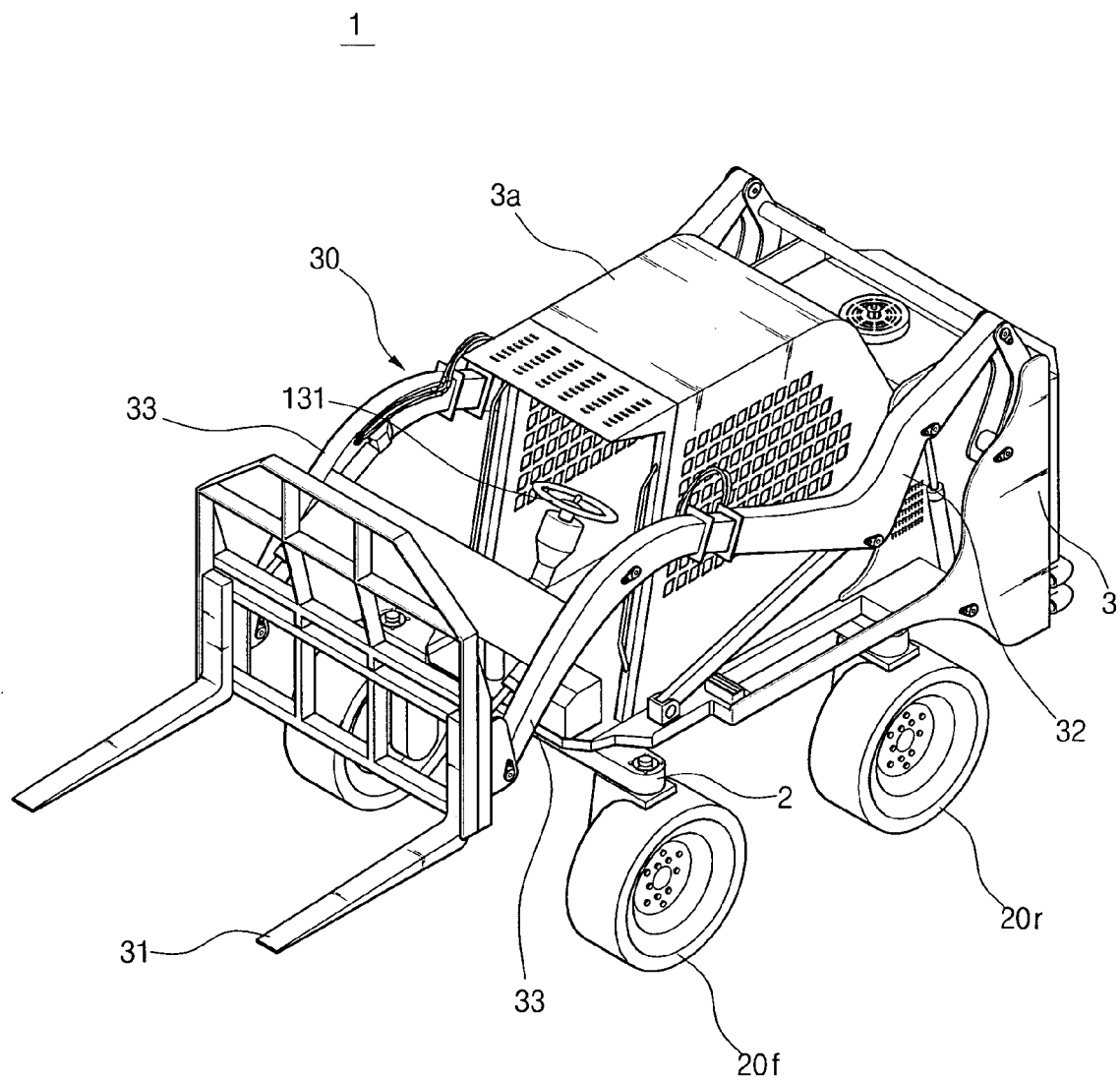
FIG. 2 is a perspective view of an industrial vehicle according to a first embodiment of the present invention.

FIG. 2 is a perspective view of an industrial vehicle according to a first embodiment of the present invention.

The industrial vehicle 1 according to the present invention has a lower frame 2, on whose lower side front and rear wheels 20f and 20r are mounted at the front and rear thereof, and an upper frame 3, on whose upper side a cab 3a equipped with a steering wheel 131 is mounted and a boom assembly 30 inclusive of a working tool is installed. When the boom assembly 30 rotates about the upper frame 3, the working tool 31 performs ascent and descent operation with respect to the upper frame 3. The upper frame 3 is installed to be rotatable relative to the lower frame 2. The boom assembly 30 has first and second main arms 32 and 33, wherein the second main arm 33 is installed to move relatively to the first main arm 32. Thus, it is possible to displace the working tool 31 in a forward direction of the vehicle 1.

Figure 3A:
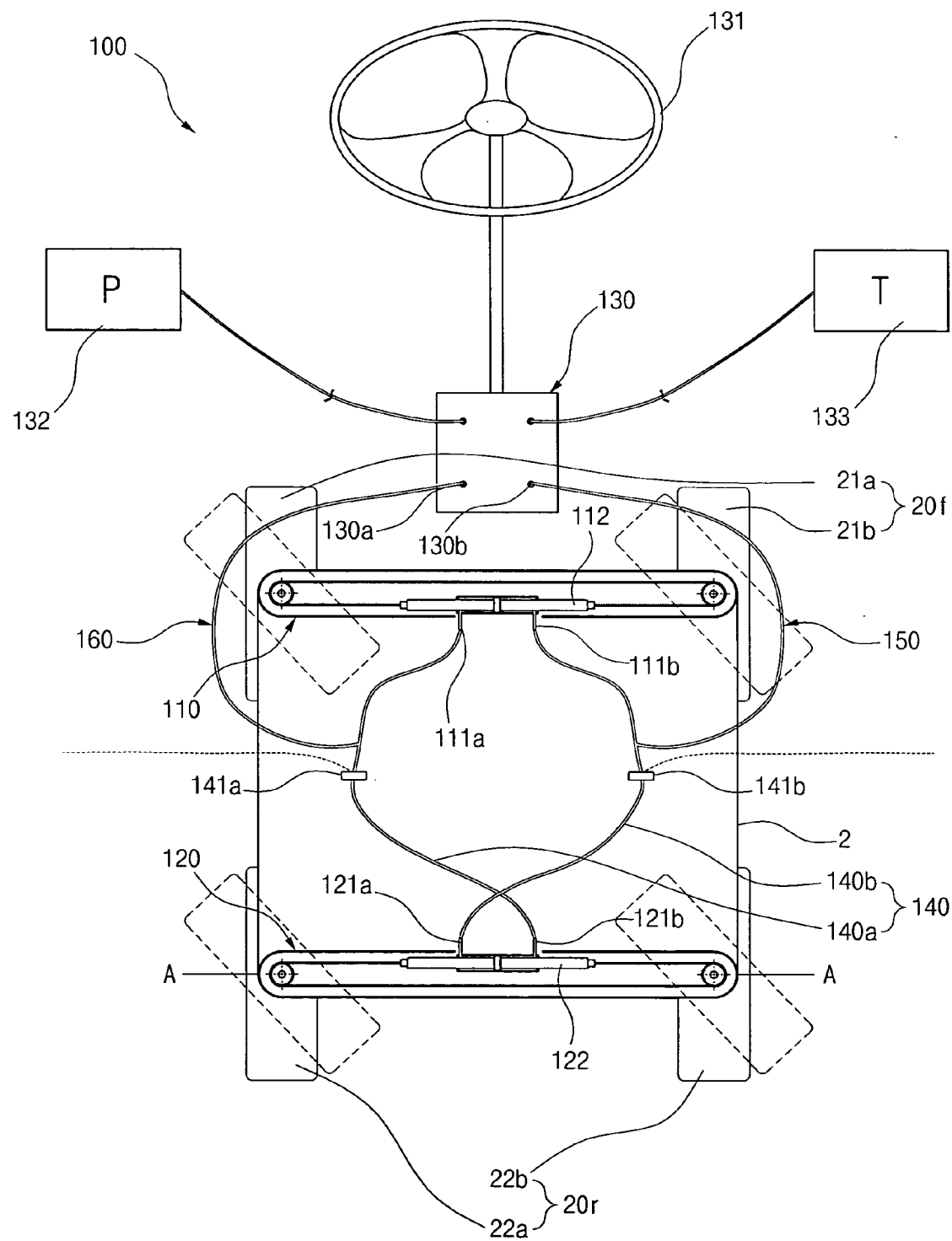
FIG. 3A is a schematic view of a steering system according to a first embodiment of the present invention.

FIG. 3A is a schematic view of a steering system according to a first embodiment of the present invention.

The front and rear wheels 20f and 20r are composed of left and right wheels 21a, 21b; 22a and 22b respectively and provided on front and rear lower sides of the lower frame 2 respectively. The front and rear wheels 20f and 20r are designed to rotate in the same direction by means of the steering system 100 without any limitation to a steering angle.

The steering system 100 includes front and rear wheel steering cases 110 and 120 which are installed at the front and rear of the lower frame 2 respectively and steer the front and rear wheels 20f and 20r, a rotary valve 130 supplying a pressure oil to the front and rear wheel steering cases 110 and 120, and first, second and third fluid channels 140, 150 and 160 connecting the rotary valve 130, the front wheel steering case 110 and the rear wheel steering case 120 respectively.

The front and rear wheel steering cases 110 and 120 are identically configured to be symmetrical in forward and backward directions, and provided on the lower side of the lower frame 2. The steering cases 110 and 120 are coupled with the left and right wheels 21a, 21b; 22a and 22b respectively. As the pressure oil is supplied to the steering cases 110 and 120, the left and right wheels 21a and 21b; and 22a and 22b are steered.

Figure 4A:
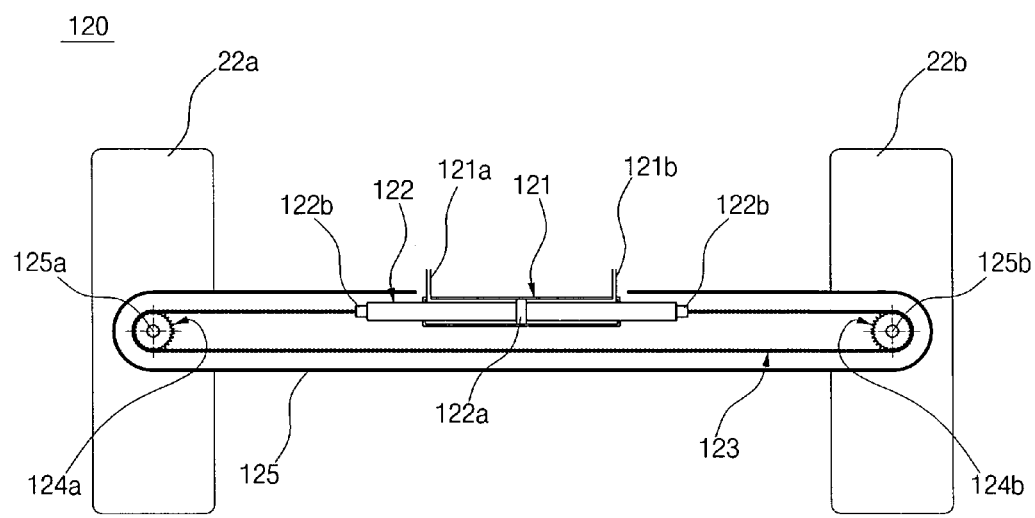
FIG. 4A is a schematic view of a steering case constituting the steering system of FIG. 3A.
Figure 4B:
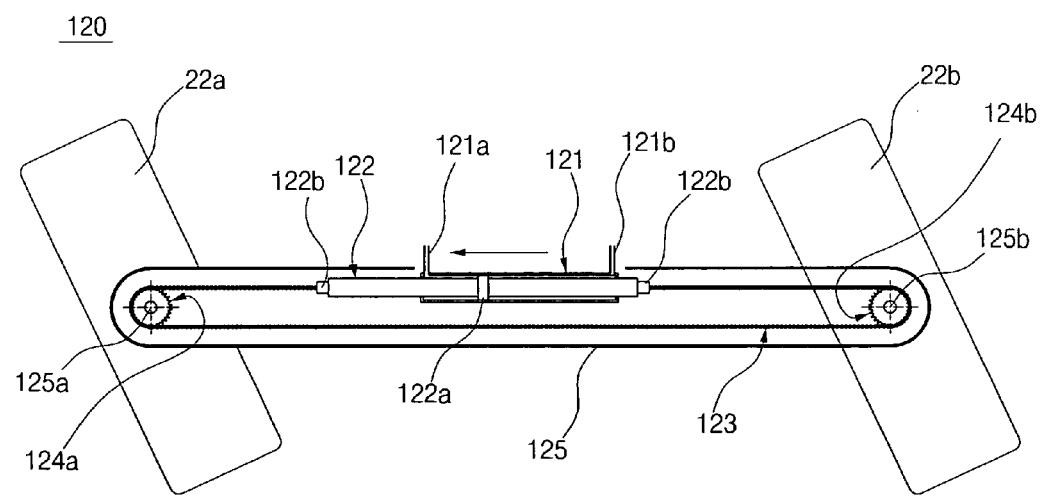
FIG. 4B shows an operation of a steering case when the steering system of FIG. 4A turns left.
Figure 4C:
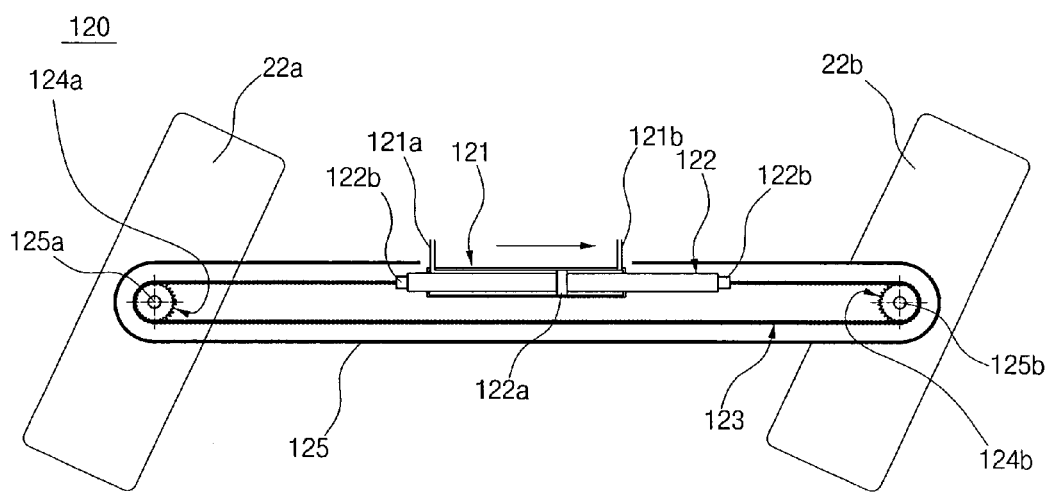
FIG. 4C shows an operation of a steering case when the steering system of FIG. 4A turns right.

FIG. 4A is a schematic view of a steering case constituting the steering system of FIG. 3A, FIG. 4B shows an operation of a steering case when the steering system of FIG. 4A turns left, and FIG. 4C shows an operation of a steering case when the steering system of FIG. 4A turns right.

The steering case shown in the figures indicates the rear wheel steering case 120. Meanwhile, the front wheel steering case 110 shown in FIG. 3A has the same configuration as the rear wheel steering case 120 and is symmetrically installed to the lower frame 2 in forward and backward directions. For this reason, only the configuration of the rear wheel steering case 120 will be described herein. The wheel steering case 120 includes a steering cylinder 122, a driving chain 123, left and right sprockets 124a and 124b, and left and right pivoting shafts 125a and 125b, all of which are installed in a housing 125. The pivoting shafts 125a and 125b are coupled with the left and right wheels 22a and 22b, respectively. Thereby, when the steering cylinder 122 is shifted right or left, the left and right wheels 22a and 22b are steered together.

A pressure oil chamber 121 of the steering case 120 is provided with left and right input ports 121a and 121b. The steering cylinder is installed in the pressure oil chamber 122 to be movable right and left. The steering cylinder 122 is provided with a piston 122a in the middle thereof, wherein the piston divides the interior of the pressure oil chamber 121 into left and right regions. The piston 122a moves left and right by means of action of the pressure oil inputted through the left and right input ports 121a and 121b of the pressure oil chamber 121, so that the steering cylinder 122 moves left and right.

The driving chain 123 is connected on both ends of the steering cylinder 122. The left and right sprockets 124a and 124b are provided to be spaced apart from both ends of the steering cylinder 122. The driving chain 123 is engaged with the left and right sprockets 124a and 124b, so that the left and right sprockets 124a and 124b are driven and rotated by the driving chain 123. The steering cylinder 122 and the driving chain 123 are connected via a set screw 122b, so that rotation of the set screw 122b can adjust a tension acting on the driving chain 123.

The left and right pivoting shafts 125a and 125b are coupled in centers of the left and right sprockets 124a and 124b, respectively. Upper ends of the left and right pivoting shafts 125a and 125b are fixed in the centers of the left and right sprockets 124a and 124b, and lower ends are coupled with gear cases 320 to be described below. As the left and right sprockets 124a and 124b and the left and right pivoting shafts 125a and 125b are rotated, the gear cases 320 are rotated together.

According to this configuration, unlike the conventional steering system where the steering angle is restricted, it is characterized in that the wheels are steered up to 90° left and right, thus being steerable within the range of 180°.

The pressure oil must be supplied to the left and right input ports 121a and 121b of the pressure oil chamber 121, wherein the rotary valve 130 installed at a predetermined position of the vehicle serves to supply the pressure oil. The rotary valve 130 is connected with the steering wheel 131, a steering pump 132 and a hydraulic tank 133, so that as the steering wheel 131 is rotated, the pressure oil is discharged from the steering pump 132 to left and right output ports 130a and 130b.

The rotary valve 130 and the front and rear wheel steering cases 110 and 120 are connected by the first, second and third fluid channels 140, 150 and 160. The first fluid channel 140 connects the front wheel steering case 110 and the rear wheel steering case 120. The second and third fluid channels 150 and 160 connect the rotary valve 130 and the front and rear wheel steering cases 110 and 120.

The first fluid channel 140 consists of a left fluid channel 140a and a right fluid channel 140b. The left fluid channel 140a connects a left input port 111a of the front wheel steering case 110 and the right input port 121b of the rear wheel steering case 120, while the right fluid channel 140b connects a right input port 111b of the front wheel steering case 110 and the left input port 121a of the rear wheel steering case 120.

The second fluid channel 150 connects a right cylinder port 130b of the rotary valve 130 and the right fluid channel 140b. The third fluid channel 160 connects a left output port 130a of the rotary valve 130 and the left fluid channel 140a. Thereby, the rotary valve 130 and the front and rear wheel steering cases 110 and 120 are communicated to each other.

The left and right fluid channels 140a and 140b of the first fluid channel 140 are provided with solenoid valves 141a and 141b which block/communicate a flow of the pressure oil. When the solenoid valves 141a and 141b communicate the flow of the pressure oil, the pressure oil is supplied from the rotary valve 130 to both the front wheel steering case 110 and the rear wheel steering case 120. By contrast, when the solenoid valves 141a and 141b block the flow of the pressure oil, the pressure oil is supplied from the rotary valve 130 only to the front wheel steering case 110. As a result, only the front wheels 20f are steered, and the rear wheels 20r are not steered. Thus, a steering operation similar to that of the general front wheel steering system is performed.

Meanwhile, while working in a narrow space where the vehicle 1 is impossible to travel forward or backward, the front and rear wheels 20f and 20r can be steered up to 90° left and right. In this case, if the front wheels 20f and the rear wheels 20r are steered at the same time, there is a danger of safety accidents. For this reason, preferably, the front wheels 20f are first steered up to 90° left or right, and then the rear wheels 20r are steered up to 90° left or right.

Thus, it is necessary to manipulate the solenoid valves 141a and 141b which block the rear wheel steering case 120 from being supplied with the pressure oil to thereby open them when a predetermined time has lapsed after the pressure oil is supplied to the front wheel steering case 110. To this end, a limit switch (not shown) may be further provided to open the solenoid valve 141a and 141b after the pressure oil is supplied to the front wheel steering case 110 and thereby the front wheels 20f are turned left and right.

Figure 3B:
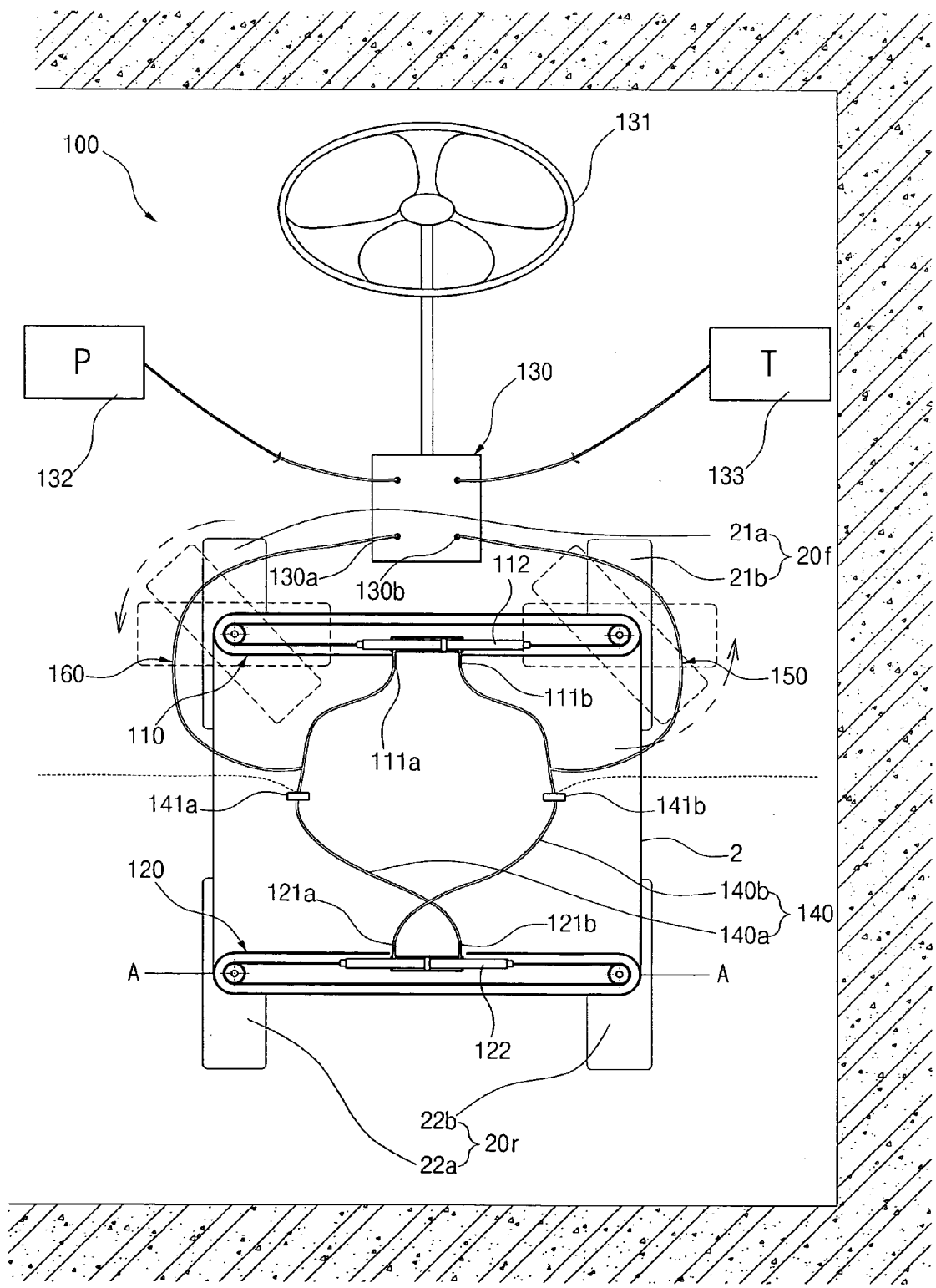
FIGS. 3B and 3C show operations where front wheels and rear wheels sequentially turn to the left.
Figure 3C:
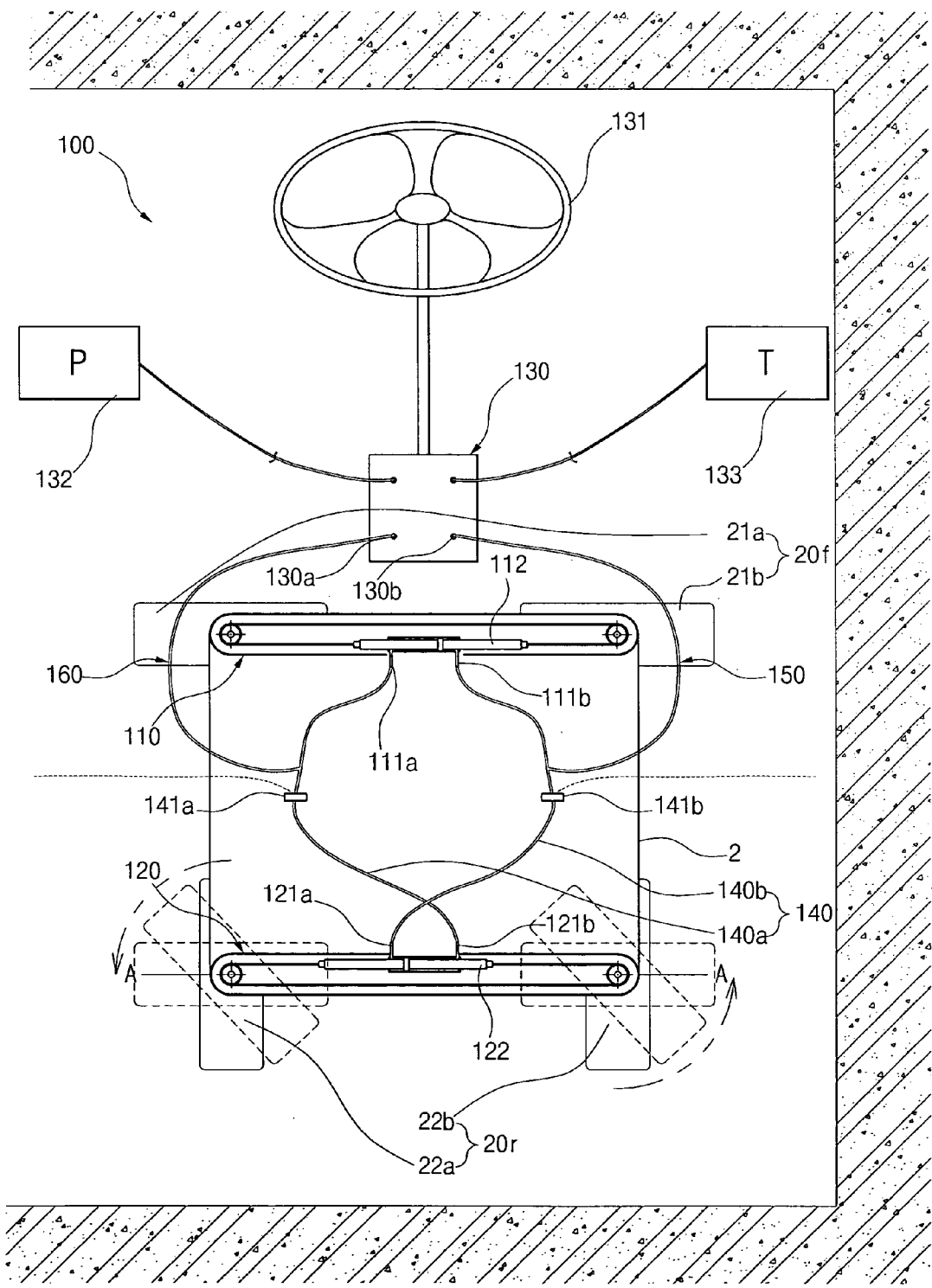

Hereinafter, an operation of this configured steering system 100 will be described. Above all, when the industrial vehicle travels on a surface street, the solenoid valves 141a and 141b are operated to stop the pressure oil from being supplied to the rear wheel steering case 120, and thereby only the front wheels 20f can be steered. Further, when the front and rear wheels 20f and 20r are simultaneously steered in order to escape out of a narrow space after the vehicle travels on the surface street, and when the steering wheel 131 turns left as shown in FIGS. 3B and 3C, the pressure oil passing through the left input port 111a is supplied to the front wheel steering case 110 to turn the front wheels 20f to the left up to 90°. Then, the solenoid valve 141a is opened by the limit switch (not shown), and the pressure oil passing through the right input port 121b is supplied to the rear wheel steering case 120 to turn the rear wheels 20r to the left up to 90°. As a result, it is possible for the vehicle to escape out of the narrow space. Therefore, the vehicle 1 can easily change its traveling direction without rotation, so that it is possible to work in the narrow space with ease.

Figure 5:
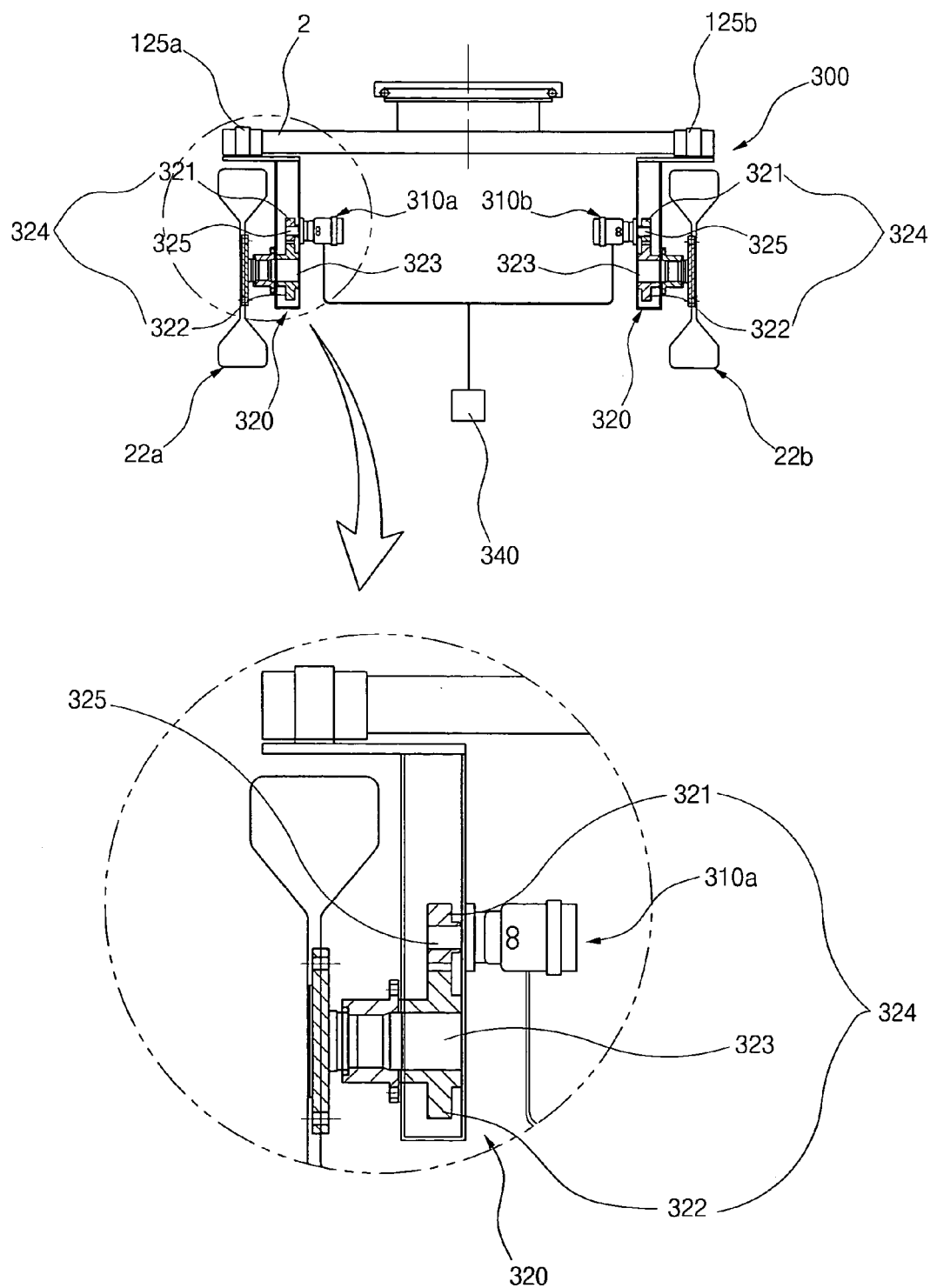
FIG. 5 is a front view of a driving unit viewed along line A—A of FIG. 4.

FIG. 5 is a front view of a driving unit viewed along line A—A of FIG. 4.

A differential driving unit 300 includes left and right wheels 22a and 22b, left and right driving hydraulic motors 310a and 310b and gear cases 320 which are installed on the left and right sides of the lower frame 2.

The gear cases 320 have upper portions connected with the pivoting shafts 125a and 125b, upper ends of which are fixed at the centers of the sprockets 124a and 124b respectively. Therefore, as the sprockets 124a and 124b are driven and rotated by the driving chain 123, the pivoting shafts 125a and 125b and the gear cases 320 are rotated together. Further, reduction gear trains 324 composed of driving gears 321 coupled to shafts of the driving hydraulic motors 310a and 310b and driven gears 322 meshed with the driving gears 321 and coupled to wheel axles 323 are mounted in the gear cases 320. The driving gears 321 and the driven gears 322 may be composed of worms and worm gears in order to prevent reverse rotation of the wheel axles.

The left and right driving hydraulic motors 310a and 310b mounted to the gear cases 320 functions to differentially drive the left and right wheels 22a and 22b. The left and right driving hydraulic motors 310a and 310b are fixed to the gear cases 320 so that their rotational shafts 325 is located in the gear cases 320. The driving gears 321 are coupled to the rotational shafts 325. The wheel axles 323 have one ends coupled with the centers of the wheels 22a and 22b and the other ends inserted into the gear cases 320. The other ends of the wheel axles 323 are provided so that the driven gears 322 are meshed with the driving gears 321. Therefore, when the driving hydraulic motors 310a and 310b are supplied with the pressure oil from the driving pump 340 and rotated, a driving force is transmitted to the wheel axles 323 through the reduction gear trains 324, thus driving the wheels 22a and 22b.

As set forth above, the left and right driving hydraulic motors 310a and 310b are connected with the driving pump 340 in parallel. For this reason, when loads applied to the left and right wheels 22a and 22b are equal, flow rates supplied from the driving pump 340 to each of the left and right driving hydraulic motors 310a and 310b are equal, so that the left and right wheels 22a and 22b are driven by the same driving force. However, when loads applied to the left and right wheels 22a and 22b are different, loads acting on the left and right driving hydraulic motors 310a and 310b are different, so that flow rates supplied to each of the left and right driving hydraulic motors 310a and 310b are different. As a result, the left and right wheels are differentially driven by different driving forces.

Figure 6:
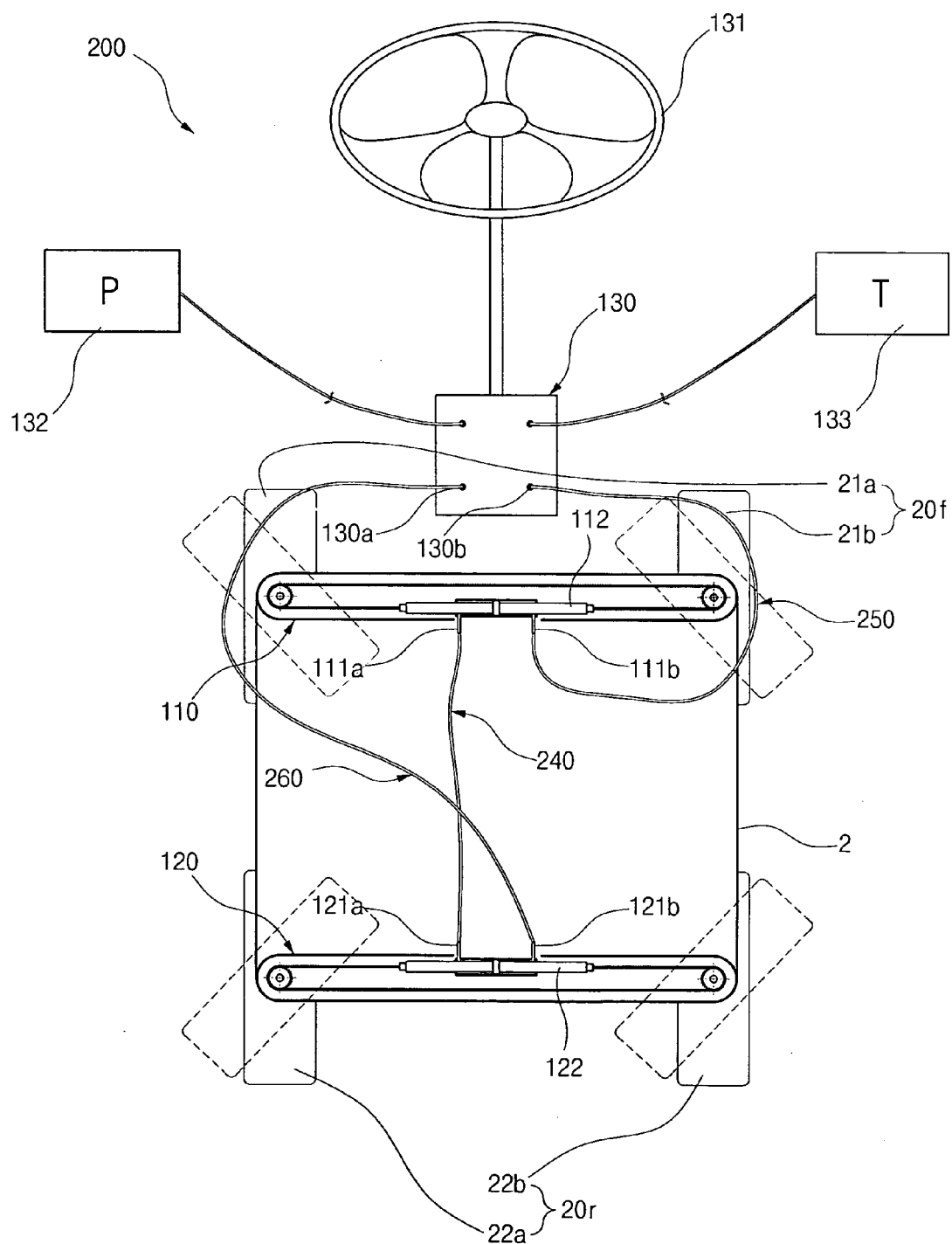
FIG. 6 is a schematic view of a steering system 200 according to a second embodiment of the present invention.

FIG. 6 is a schematic view of a steering system 200 according to a second embodiment of the present invention.

A first fluid channel 240 connects the front wheel steering case 110 and the rear wheel steering case 120, and second and third fluid channels 250 and 260 connects the rotary valve 130 and the front and rear wheel steering cases 110 and 120. Thereby, the pressure oil is supplied from the rotary valve 130 to the front and rear wheel steering cases 110 and 120 by the first, second and third fluid channels 240, 250 and 260. This configuration is equal to that of the first embodiment, the other similar components will be described using the same reference numbers.

However, the second fluid channel 250 connects the right cylinder port 130b of the rotary valve 130 of the right input channel 111b of the front wheel steering case 110. The first fluid channel 240 connects the left input port 111a of the front wheel steering case 110 and the left input port 121a of the rear wheel steering case 120. The third fluid channel 260 connects a right input port 121b of the rear wheel steering case 120 and the left output port 130a of the rotary valve 130. In this manner, because the front wheel steering case 110, the rear wheel steering case 120 and the rotary valve 130 are connected in series, the pressure oil from the rotary valve 130 is inputted to the front wheel steering case 110 and the pressure oil from the front wheel steering case 110 is inputted to the rear wheel steering case 120 again. Thus, steering cylinders 112 and 122 of the front and rear wheel steering cases 110 and 120 are operated to steer the front and rear wheels 20f and 20r, respectively.

When the steering wheel 131 is rotated to the left in order to turn the vehicle to the left, the pressure oil from the rotary valve 130 passes through the left output port 130a and the third fluid channel 260 to be supplied to the right input port 121b of the rear wheel steering case 120, so that the steering cylinder 122 moves to the left, and thus the rear wheels 20r are steered to the left. The pressure oil from the left input port 121a of the rear wheel steering case 120 is inputted into the front wheel steering case 110 through the first fluid channel 240 and the left input port 111a of the front wheel steering case 110, so that the steering cylinder 112 of the front wheel steering case 110 moves to the right, and thus the front wheels 20f are steered to the left.

The steering cylinders 112 and 122 of the front and rear wheel steering cases 110 and 120 move in the opposite direction to each other, and the front and rear wheels 20f and 20r are steered in the same direction, so that the vehicle can easily change its traveling direction without traveling and rotating, thus being capable of smoothly working in the narrow space.

In the present embodiment, because the front and rear wheel steering cases 110 and 120 and the rotary valve 130 are connected in series, the foregoing solenoid valves are not installed. Thus, it is characterized in that the front and rear wheels 20f and 20r are always cooperated and steered.

Figure 7:
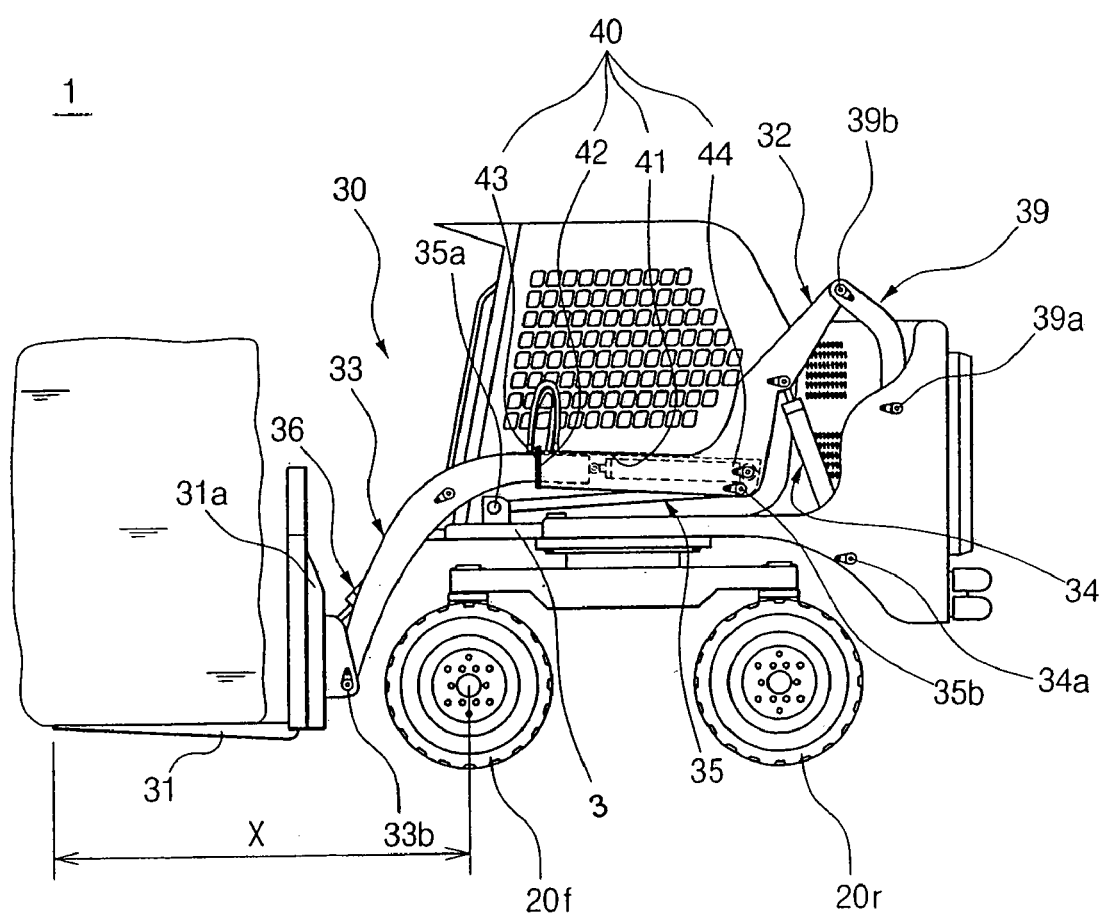
FIG. 7 is a side view of an industrial vehicle having a boom assembly according to a first embodiment of the present invention.
Figure 8:
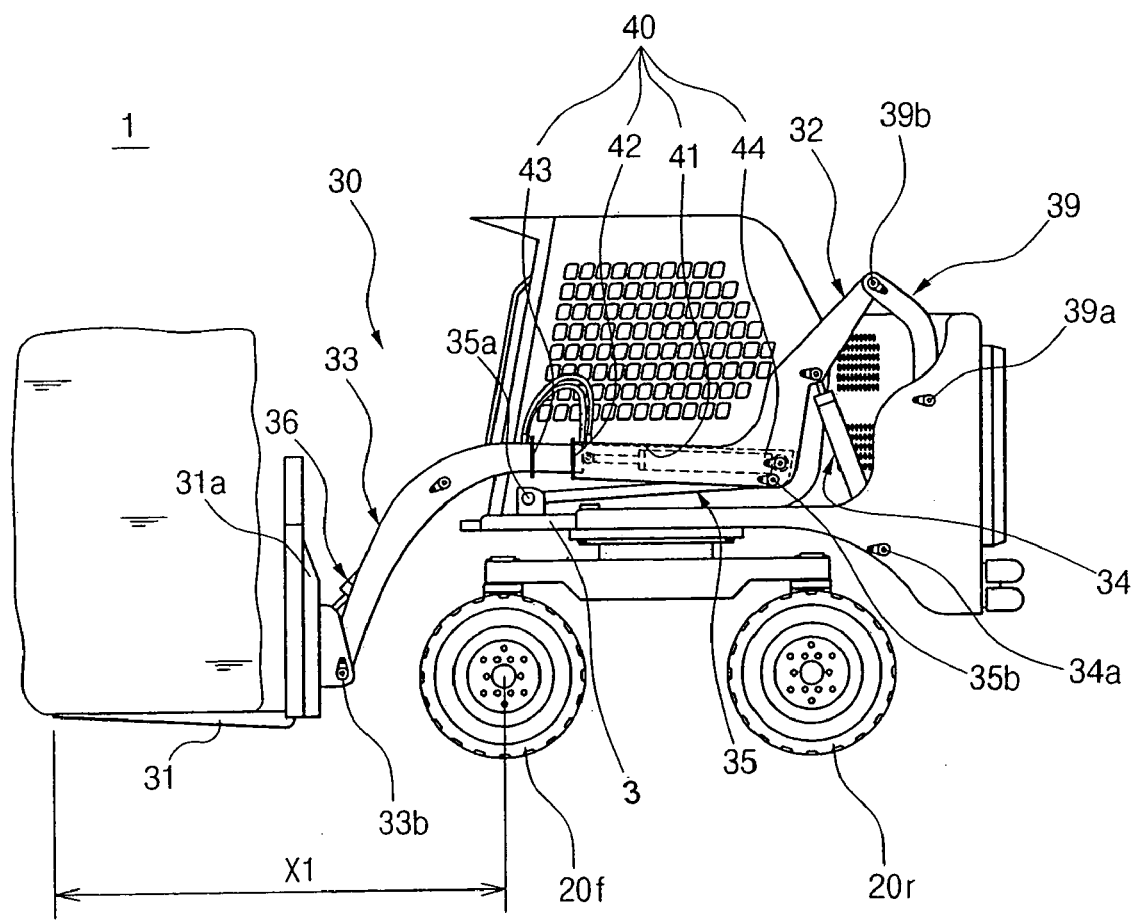
FIG. 8 shows an extension of a boom length adjuster of the industrial vehicle shown in FIG. 7.
Figure 9:
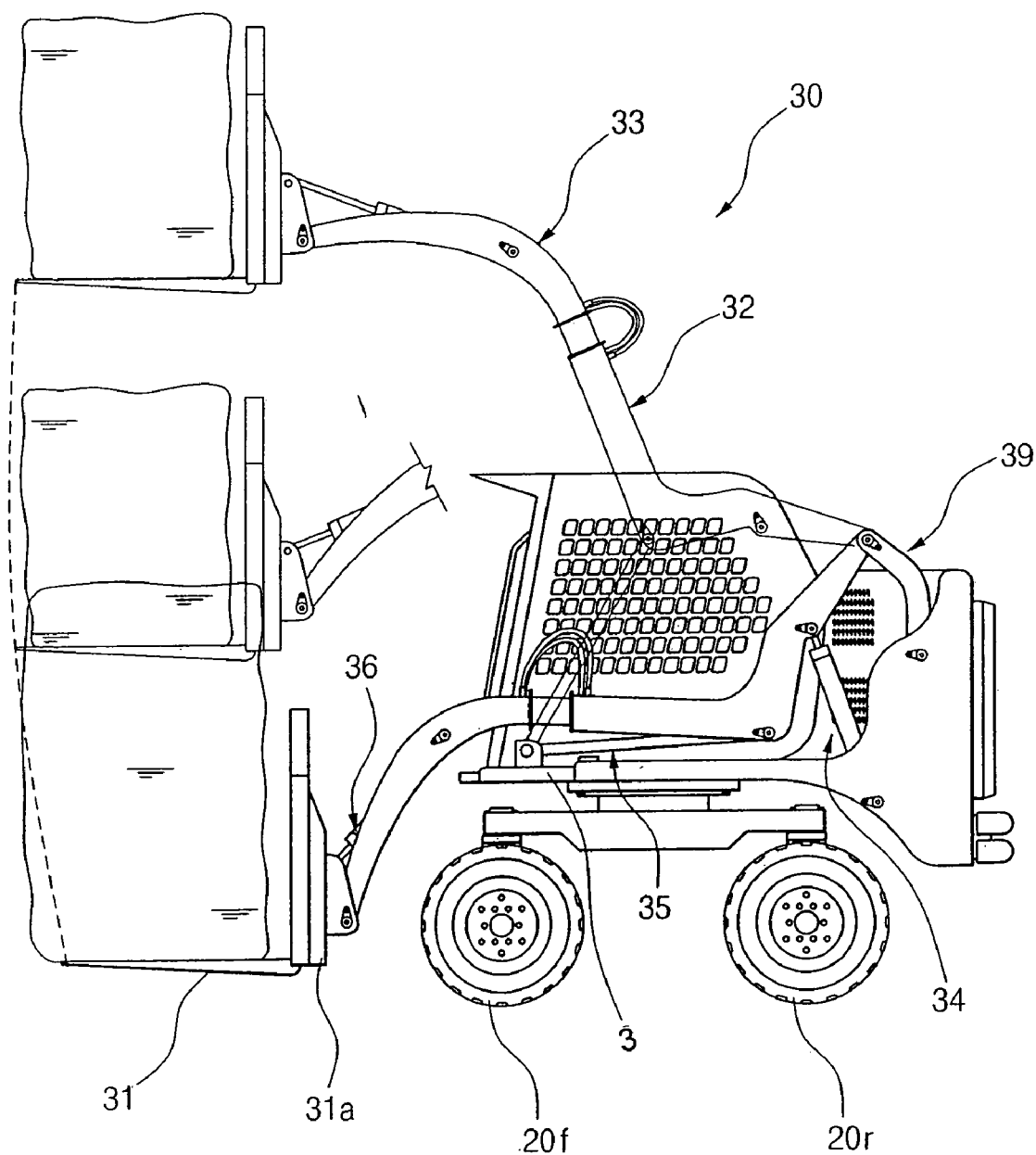
FIG. 9 shows an operation of a boom assembly according to a first embodiment.
Figure 10:
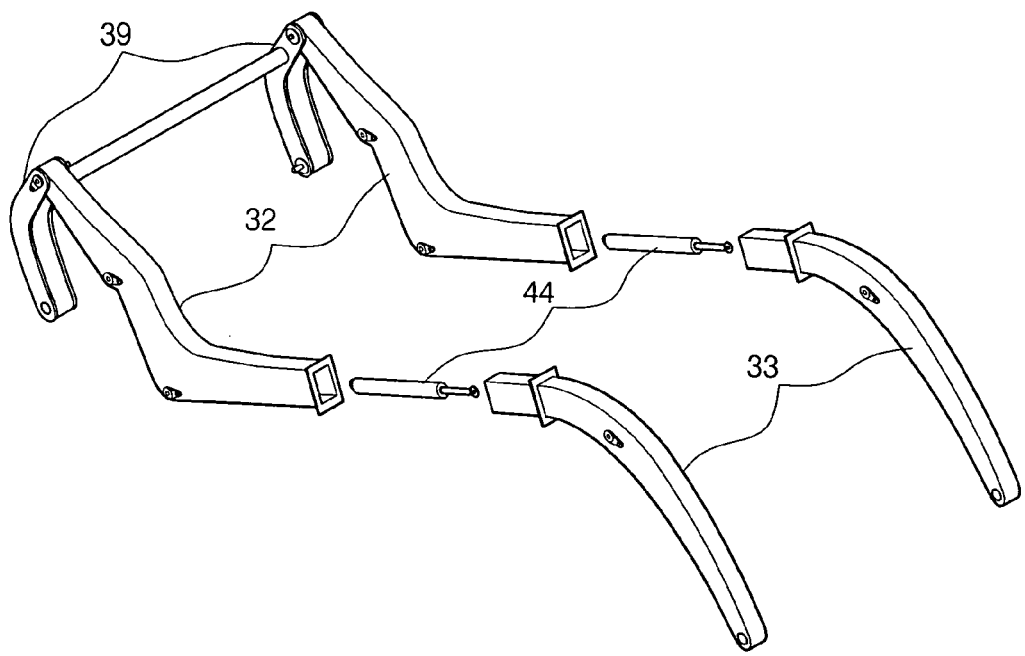
FIG. 10 is a perspective view of a boom assembly according to a first embodiment.

FIG. 7 is a side view of an industrial vehicle having a boom assembly according to a first embodiment of the present invention. FIG. 8 shows an extension of a boom length adjuster of the industrial vehicle shown in FIG. 7. FIG. 9 shows an operation of a boom assembly according to a first embodiment. FIG. 10 is a perspective view of a boom assembly according to a first embodiment.

A boom assembly 30 includes a rear arm 39 fixed to the upper frame 3, a boom length adjuster 40, a first main arm 32, a second main arm 33, a lift actuator 34, a control link 35, a working tool actuator 36, and a working tool horizontal adjuster (not shown).

The rear arm 39 is roatably fixed at the rear of the upper frame 3 by a fixing pin 39a. A rear end of the first main arm 32 is roatably fixed to a front end of the rear arm 39 by a fixing pin 39b. A front end of the first main arm 32 is slidably coupled to the second main arm 33.

The boom length adjuster 40 having a chamber 41, a first flange 42, a second flange 43 and a telescopic actuator 44 is installed between the first and second main arms 32 and 33, thereby sliding the second main arm 33 with respect to the first main arm 32 in forward and backward directions.

The chamber 41 is formed inside the front end of the first main arm 32 in a longitudinal direction, and the first flange 42 is formed around the front end of the first main arm 32. Further, a rear end of the second main arm 33 is slidably inserted into the chamber 41.

The telescopic actuator 44 is provided between the first main arm 32 and the second main arm 33 to move the second main arm 33 relative to the first main arm 32. The telescopic actuator 44 has a rear end fixed in the chamber 41, and a front end fixed to the rear end of the second main arm 33 and installed in the chamber 41.

The first flange 42 is formed around the front end of the first main arm 32, and the second flange 43 is formed around the rear end of the second main arm 33 to come into contact with the first flange 42 when the telescopic actuator 44 is in a contracted state. The first and second main flanges 42 and 43 serve to restrict a stop position so that the second main arm 33 is not pushed backward by inertia when moving relative to the first main arm 32.

When the second main arm 33 moves forward by means of the boom length adjuster 40 configured like this, a length up to a leading end of the working tool is increased by a difference between X and X1 as shown in FIG. 8. Therefore, the length of the boom assembly 30 is freely adjusted, and in the mean time working can be performed.

The lift actuator 34 has one end fixed rotatably to the upper frame 3 by a fixing pin 34a and the other end fixed rotatably to the intermediate portion of the first main arm 32. A position where the lift actuator 34 is fixed to the upper frame 3 is in the front of the fixed position of the rear arm 39. To this end, the lift actuator 34 is installed in the front of the rear arm 39, and serves to endow a driving force so that the first main arm 32 and the second main arm 33 are rotated while performing a telescopic motion in a longitudinal direction.

The control link 35 has one end fixed rotatably in the front of the upper frame 3 by a fixing pin 35a and the other end fixed rotatably fixed at 35b to the first main arm 32. Because the control link 35 has a constant length, the other end of the control link 35 performs a circular motion about the fixing pin 35a connected to the upper frame 3, and thereby a rotational motion of the first main arm 32 is controlled. At this time, the leading end of the working tool 31 of the boom assembly 30 moves while taking a locus of a substantially straight line.

The working tool 31 and a working tool bracket 31a are mounted on front end of the second main arm 33. The working tool bracket 31a is rotatably fixed to the front end of the second main arm 33 by a fixing pin 33b and the working tool 31 is fixed in the front of the working tool bracket 31a, so that the working tool bracket 31a and the working tool 31 are rotatably installed to the second main arm 33 in an upward and downward direction.

The working tool actuator 36 has one end fixed to the second main arm 33 and the other end fixed pivotably to the working tool bracket 31a by a fixing pin, thereby pivoting the working tool bracket 31a.

Further, when the lift actuator 34 is telescoped to rotate the first main arm 32, the working tool horizontal adjustor (not shown) operates the working tool actuator 36. As a result, a horizontal level of the working tool 31 is automatically adjusted. Meanwhile, an operator of the vehicle may manually adjust the horizontal level of the working tool 31 by releasing an automatic adjustment function of the working tool horizontal adjustor to use an adjustment lever (not shown) installed to adjust the working tool actuator 36.

The working tool horizontal adjustor (not shown) includes a control valve (not shown) for controlling a flow rate operating the working tool actuator 36 based on a variation of the flow rate operating the lift actuator 34. The control valve (not shown) may employ various modes such as a mode of measuring a tilt angle of the first main arm 32 to control the working tool actuator 36 based on the measured tilt angle, a mode of measuring a tilt angle of the working tool 31 itself to control the working tool actuator 36 based on the measured tilt angle, etc. including the mode of controlling the flow rate of the working tool actuator 36 based on the variation of the operating flow rate of the lift actuator 34 as set forth above.

As shown in FIG. 9, the working tool horizontal adjustor (not shown) is operated while the boom assembly 30 is operated to raise the working tool 31, so that the leading end of the working tool 31 moves along a linear path substantially perpendicular to the ground. Thereby, it is possible to perform a work under the condition that an object loaded on the working tool 31 is stabilized. Therefore, the operator or driver does not need to manipulate, for example move forward or backward, the vehicle in order to avoid collision of the working tool 31 with a truck (not shown) etc. on which the objects (not shown) are loaded.

Further, unlike the conventional fashion where the vehicle moves forward with the working tool 31 located under the upper frame 3 on loading the object on the working tool 31, the boom length adjustor 40 is operated with the working tool 31 located under the upper frame 3, so that the object located distant from the vehicle can be easily loaded on the working tool.

Further, an operation when the object is unloaded from the working tool 31 is as follows. When the boom length adjustor 40 is operated with the boom assembly 30 raised, the second main arm 33 moves relative to the first main arm 32, so that the working tool 31 moves forward with respect to the vehicle. In this state, when the lift actuator 34 is operated to lower the boom assembly 30, the object can be freely unloaded up to a distant position in front of the vehicle. Thus, it is not required to perform an unnecessary work, for example, of progressing the vehicle into a container (not shown) or a freight compartment of the truck (not shown) to unload the objects and then reversing the vehicle.

Figure 11:
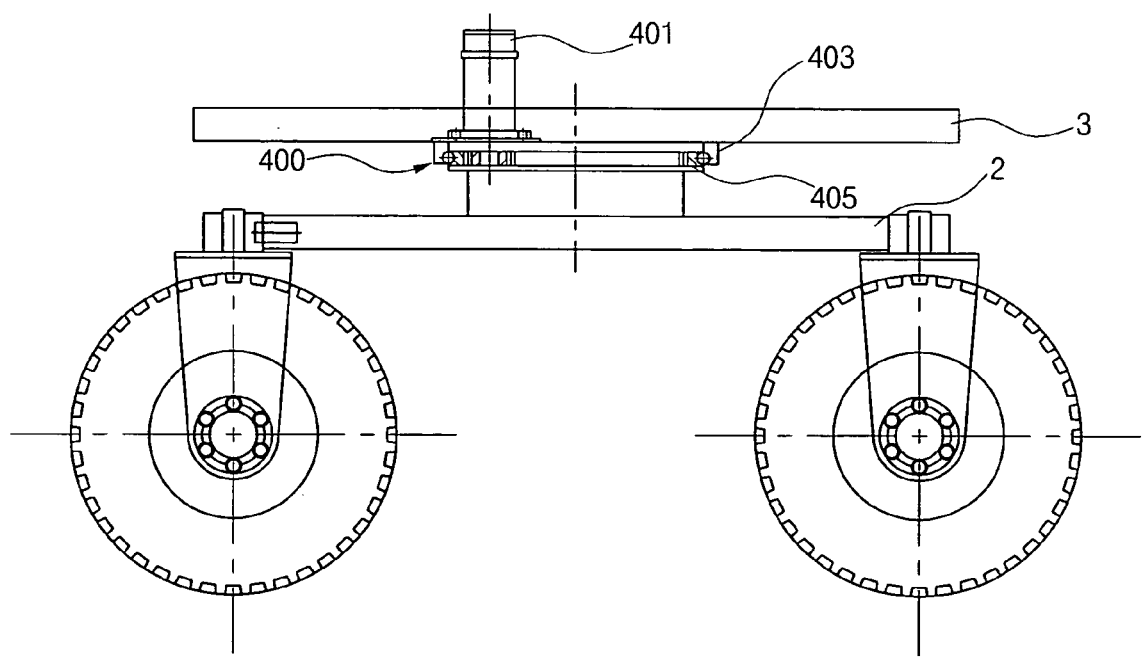
FIG. 11 is a schematic view of a pivoting unit of an upper frame according to a first embodiment of the present invention.
Figure 12:
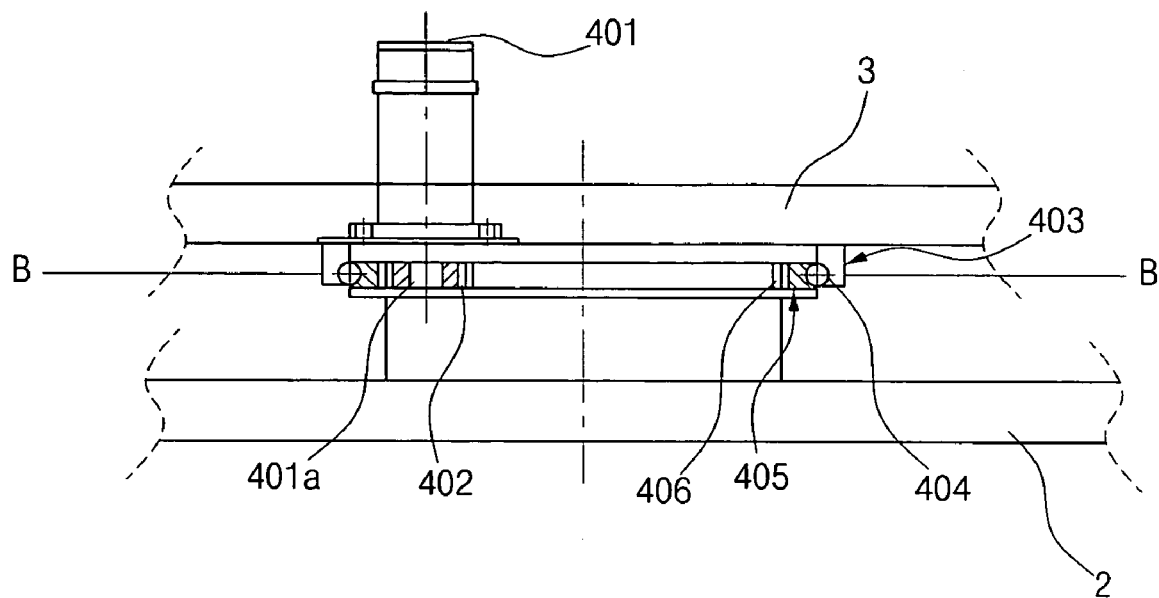
FIG. 12 is a partial enlarged view of FIG. 11.
Figure 13:
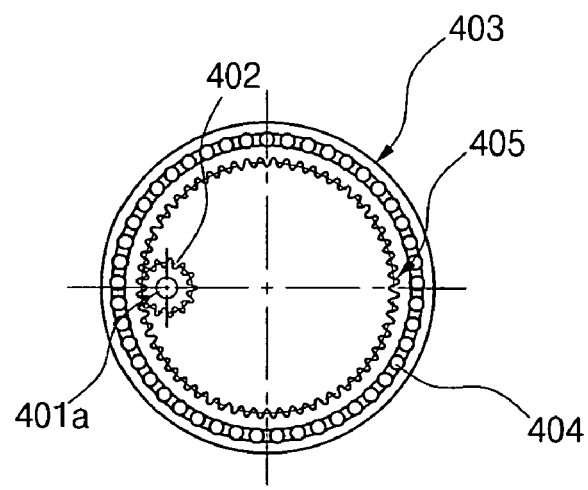
FIG. 13 is a cross-sectional view taken along line B—B of FIG. 12.

FIG. 11 is a schematic view of a pivoting unit of an upper frame according to a first embodiment of the present invention. FIG. 12 is a partial enlarged view of FIG. 11. FIG. 13 is a cross-sectional view taken along line B—B of FIG. 12.

A pivoting unit 400 of the upper frame is provided between the upper and lower frames 3 and 2, and serves to rotate the upper frame 3 about the lower frame 2.

The upper frame pivoting unit 400 includes a swing motor 401 and a supporting ring 403 which are provided to the upper frame 3, and a swing ring 405 which is provided to the lower frame 2.

The supporting ring 403 extends vertically under the upper frame 3. In correspondence to this, the swing ring 405 extends vertically over the lower frame 2. The supporting ring 403 and the swing ring 405 are coupled to each other via a bearing 404, so that the upper frame 3 is rotatably coupled to the lower frame 2. Further, the swing motor 401 is mounted on the upper frame 3. A shaft 401a of the swing motor 401 is fitted with a swing driving gear 402. The swing driving gear 402 is installed to mesh with a swing gear provided in the swing ring 405.

When the swing motor 401 is driven, the swing driving gear 402 coupled to the shaft 401a is rotated. At the same time, the swing driving gear 402 moves along an inner circumferential surface of the swing gear 406, and the supporting ring 403 and the upper frame 3 rotate relative to the lower frame 2.

Figure 14:
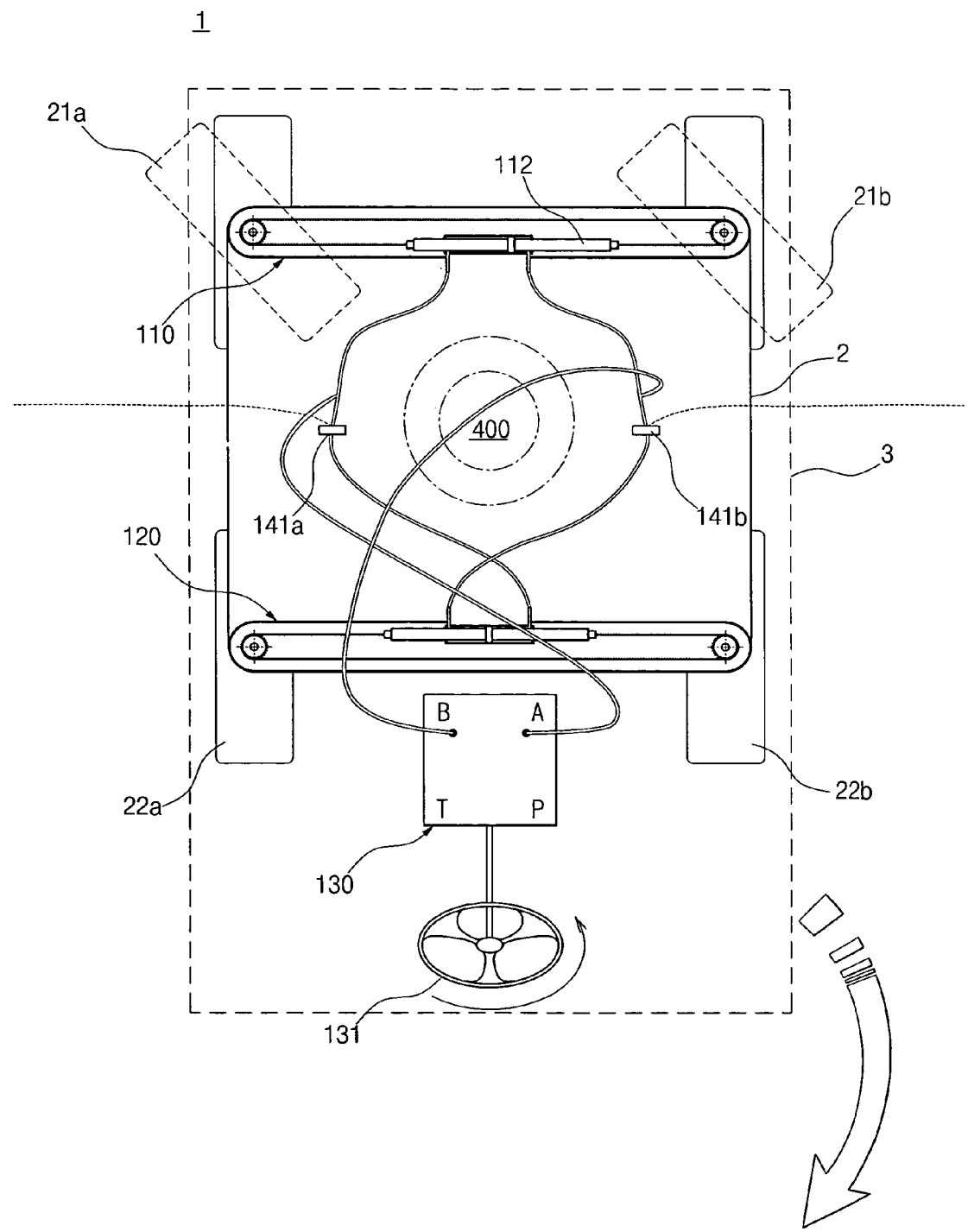
FIG. 14 shows an operation of a steering system when an upper frame is pivoted in accordance with a first embodiment of the present invention.
Figure 15:
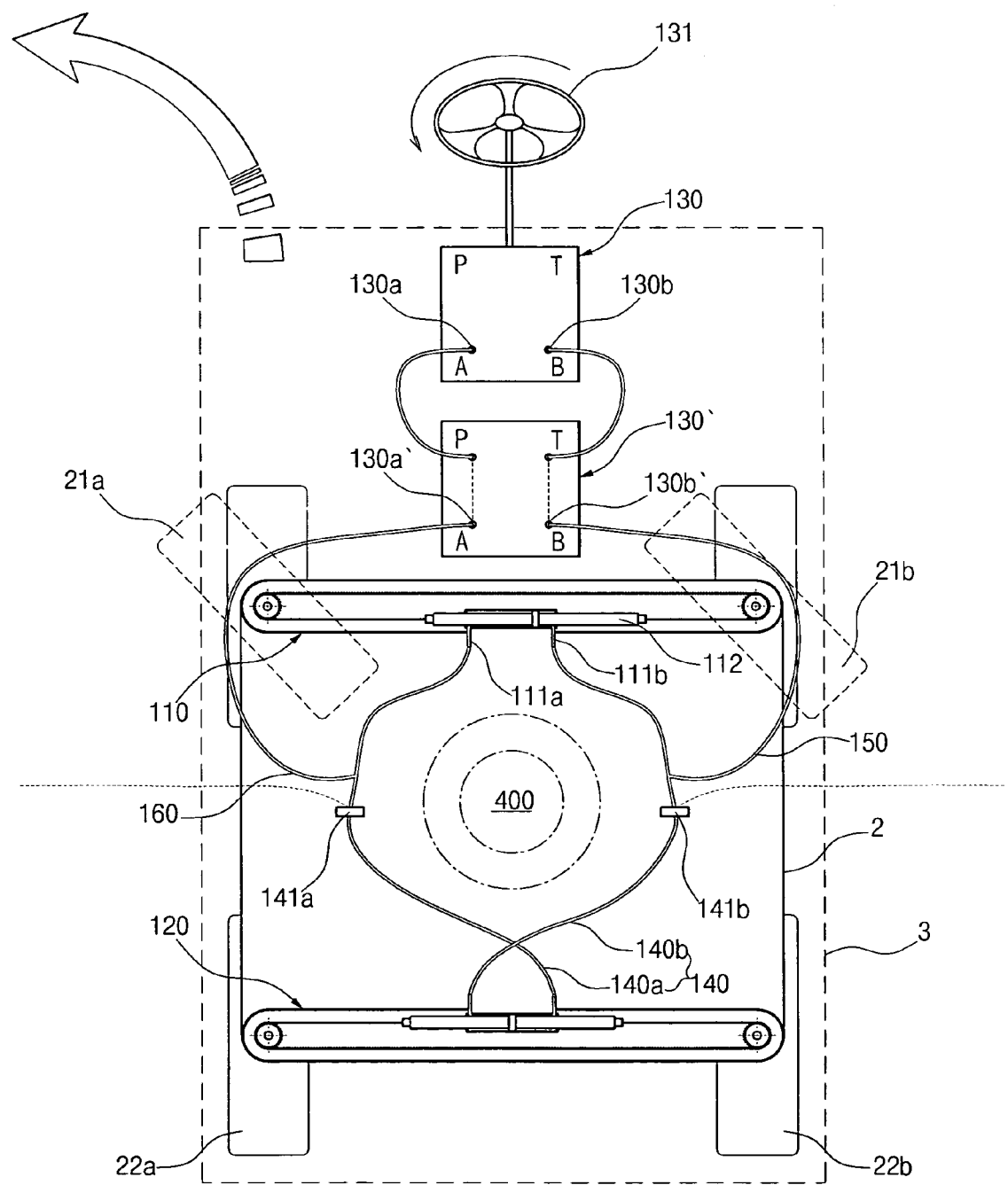
FIG. 15 shows an operation of a steering system when an upper frame is not pivoted in accordance with a second embodiment of the present invention.
Figure 16:
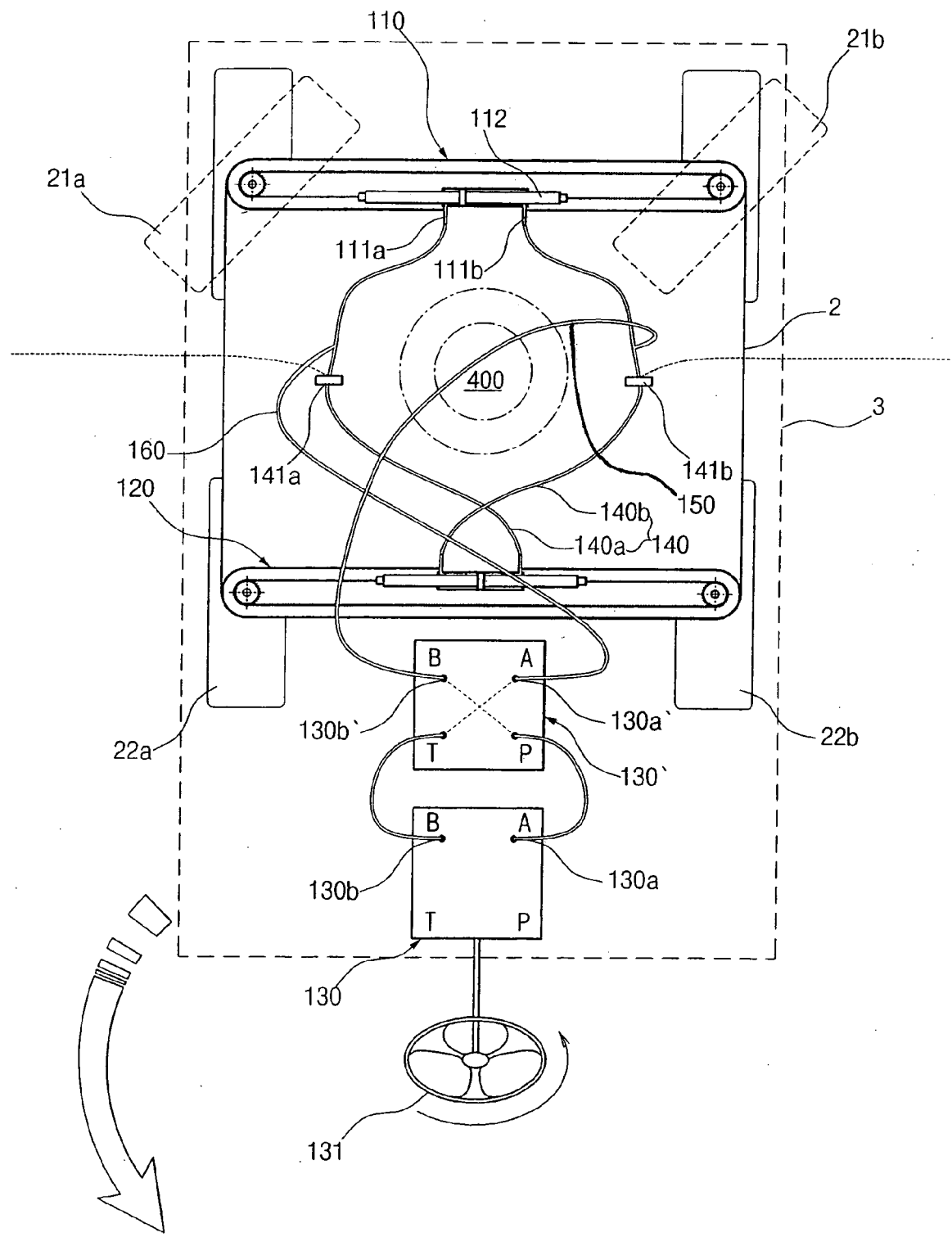
FIG. 16 shows an operation of a steering system when an upper frame is pivoted in accordance with a second embodiment of the present invention.

FIG. 14 shows an operation of a steering system when an upper frame is pivoted in accordance with a first embodiment of the present invention. FIG. 15 shows an operation of a steering system when an upper frame is not pivoted in accordance with a second embodiment of the present invention. FIG. 16 shows an operation of a steering system when an upper frame is pivoted in accordance with a second embodiment of the present invention.

Meanwhile, when the vehicle 1 performs traveling or working with the upper frame 3 and the lower frame 2 aligned toward the front of the vehicle 1, the solenoid valves 141a and 141b block the pressure oil supplied to the rear wheel steering case 120. For this reason, when the steering wheel 131 is rotated to the left to turn the vehicle 1 to the left, only the left and right front wheels 21a and 21b are steered with the left and right rear wheels 22a and 22b fixed. Therefore, the vehicle 1 travels in a direction required by the driver.

The lower frame 2 continues to face the front of the vehicle 1. However, when traveling or working is intended to be performed toward the rear of the vehicle by rotating the upper frame 3 about the pivoting unit 400 with respect to the lower frame 2, the steering wheel 131 can be rotated to the left in order to turn the vehicle 1 to the left on the basis of the driver. In this case, the vehicle 1 moves to the right opposite to the rotational direction on the principle of a forklift as shown in FIG. 14. Thus, the driver gets considerably confused about this operation.

Therefore, according to the present invention, as shown in FIG. 15, when the upper frame 3 is rotated about the pivoting unit 400 with respect to the lower frame 2 and aligned in the opposite direction to the lower frame 2, rotation of the steering wheel 131 allows the vehicle 1 to travel in the same direction as the rotational direction of the steering wheel 131. To this end, a direction switching valve 130' is further provided between the rotary valve 130 and the front wheel steering case 110. The direction switching valve 130' serves to switch a direction of the pressure oil which is discharged from the left and right output ports 130a(A) and 130b(B) of the rotary valve 130 to the left and right input ports 111a(A) and 111b(B) of the front wheel steering case 110 respectively.

As shown in FIG. 15, when the vehicle is intended to turn to the left with the lower and upper frames 2 and 3 aligned in the same direction, rotating the steering wheel 131 to the left causes the pressure oil from the pump P to be discharged to the left output port 130a(A), and then the pressure oil is supplied to the left input port 111a of the front wheel steering case 110 via a left cylinder port 130a' of the direction switching valve 130', thus moving the steering cylinder 112 to the right. Thereby, the left and right front wheels 21a and 21b are steered to the left.

By contrast, as shown in FIG. 16, when the vehicle is intended to turn to the left with the lower and upper frames 2 and 3 aligned in the opposite direction, rotating the steering wheel 131 to the left causes the pressure oil from the pump P to be discharged to the left output port 130a'(A), and the direction switching valve 130' is switched by the limit valve (not shown). Subsequently, the pressure oil is discharged to a right cylinder port 130b'(B) of the direction switching valve 130' and supplied to the right input port 111b of the front wheel steering case 110, thus moving the steering cylinder 112 to the right. Thereby, the left and right front wheels 21a and 21b are steered to the right. Consequently, the vehicle travels in the direction intended by the driver.

Figure 17:
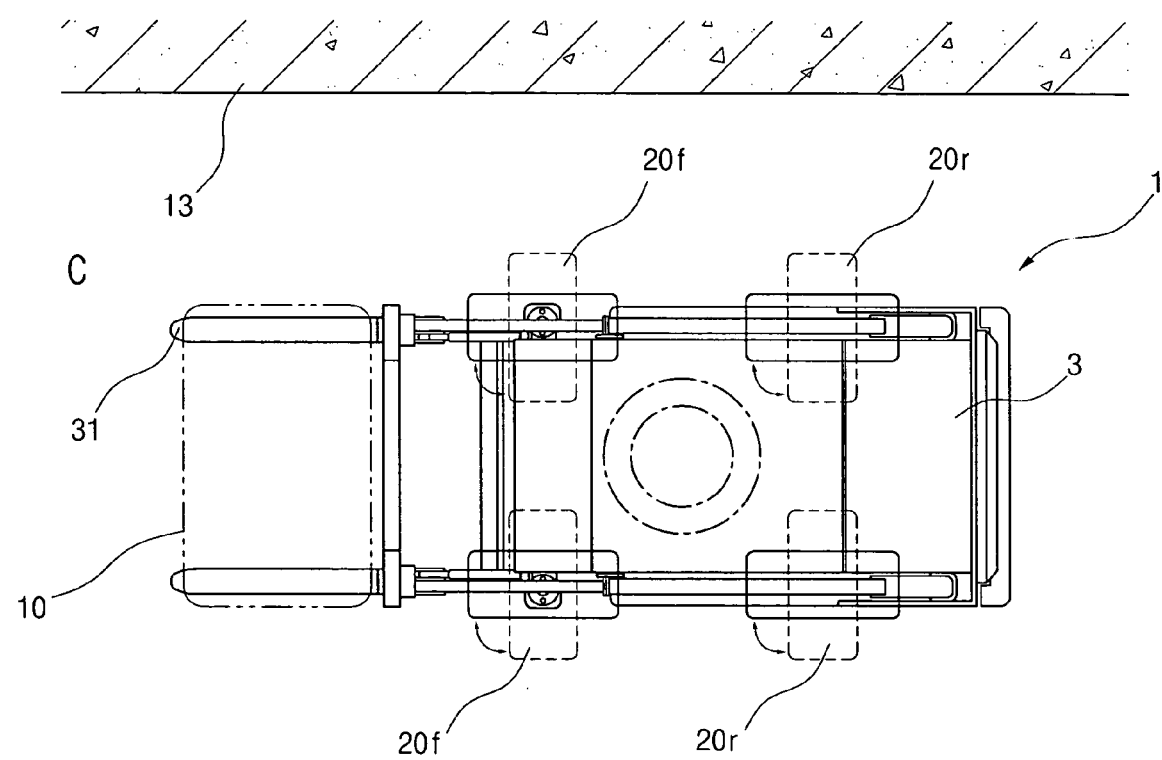
FIG. 17 shows an operation where an industrial vehicle according to a first embodiment of the present invention loads an object on a working tool.
Figure 18:
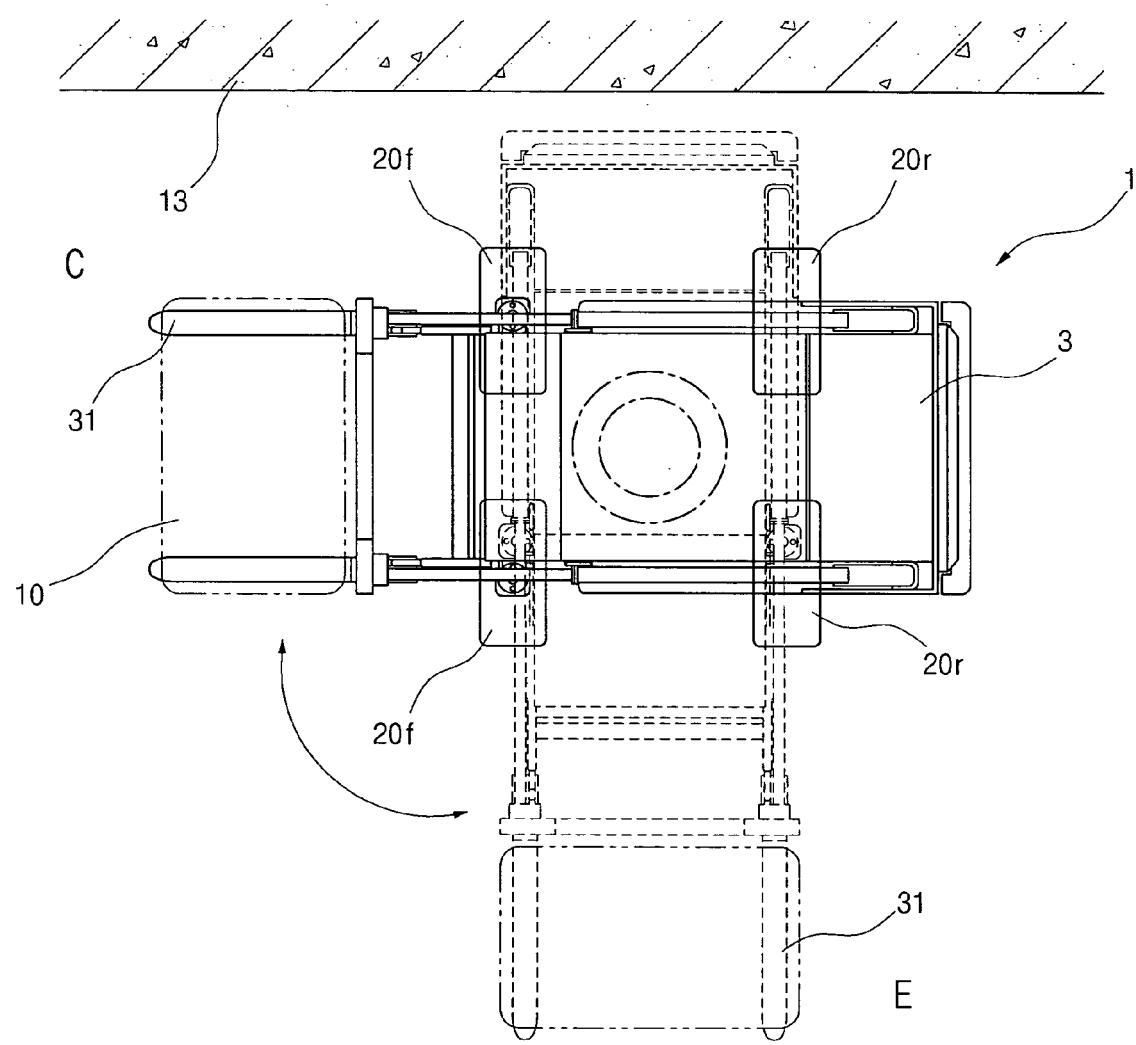
FIG. 18 shows an operation where the industrial vehicle of FIG. 17 rotates to unload an object.

FIG. 17 shows an operation where an industrial vehicle according to a first embodiment of the present invention loads an object on a working tool. FIG. 18 shows an operation where the industrial vehicle of FIG. 17 rotates to unload an object.

The work performed in the narrow space is characterized in that a position where an object is located is close to a place where the object is to be loaded. In this case, without the vehicle performing a series of motions, namely a progressing motion, a reversing motion, a rotating motion, and the progressing motion again with the object loaded on the working tool 31, only the pivoting unit 400 of the upper frame is operated, and thereby only the working tool is rotated. In this manner, the work can be smoothly performed.

In order for the industrial vehicle 1 according to the present invention to transfer the object 10 from a place C to a new loading place E, the object 10 is loaded on the working tool 31 of the vehicle 1 in the place C, and then the front and rear wheels 20f and 20r of the vehicle 1 are steered in a direction of the place E. Then, when the upper frame 3 is rotated in the direction of the place E, a progress direction of the vehicle 1 and a direction of the working tool 31 are easily changed in the direction of the place E. In this state, the object may be unloaded. Otherwise, the length of the boom assembly 30 is increased, and thereby the object may be unloaded at a proper position in front of the vehicle 1. Thus, the work can be performed without undesired manipulation of the vehicle, such as the progressing motion, the reversing motion, etc. Further, the object can be rapidly transferred in the narrow space.

The working tool 31 of the industrial vehicle 1 according to the present invention may be displaced by a variety of working tools, such as a forked platform for the forklift, a bucket of a loader, a bucket of an excavator etc., so that various works can be performed. In this case, the wheels can be freely steered without restriction to the steering angle. The upper frame can be rotated. The length of the boom assembly can be increased. Due to these various functions, it is possible to exert good maneuverability and good performance as the multipurpose industrial vehicle.

According to the industrial vehicle of the present invention as set forth above, the steering system having the driving chains and the sprockets driven by the steering cylinders is mounted to the industrial vehicle, so that the front and rear wheels are steered in the same direction without restriction to the steering angle. Therefore, the progress direction of the vehicle is easily changed in the narrow space, and the differential driving of the left and right wheels is efficiently performed.

Further, the upper frame is freely rotated with respect to the lower frame through the pivoting unit. The direction switching valve is further provided, so that when the upper frame is pivoted at the angle of 180°, the steering direction of the steering wheel is identical with the progress direction of the vehicle. Thereby, it is possible to facilitate convenience of the driver.

In addition, the boom length adjuster is mounted to the boom assembly of the industrial vehicle. Thus, the leading end of the working tool moves along the substantially vertical linear path, and the boom length is adjusted, and thereby the loading position of the object can be freely selected. The working tool horizontal adjuster is mounted to the boom assembly, so that the horizontal level of the working tool is automatically adjusted when the boom assembly is ascended or descended. Thereby, it is possible to improve working efficiency and safety.

The foregoing embodiment and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. An industrial vehicle, comprising:
    a lower frame on front and rear lower sides of which front and rear wheels are installed respectively, the front and rear wheels being composed of left and right wheels;
    an upper frame having a cab with a steering wheel located on an upper portion thereof and coupled upside the lower frame;
    steering cylinders, each provided with left and right input ports and a driving chain connected at opposite ends to opposite ends of a corresponding one of the steering cylinders for moving the driving chain left and right by means of a pressure oil supplied to the left and right input ports;
    left and right sprockets driven by the driving chain;
    front and rear wheel steering cases having left and right pivoting shafts, the left and right pivoting shafts being coupled to the left and right sprockets on upper portions thereof and to the left and right wheels on lower portions thereof to transmit driving force to the left and right wheels;
    a rotary valve connected to a steering pump and a hydraulic tank, provided with left and right output ports and discharging pressure oil from the steering pump to the left and right input ports based on rotation of the steering wheel; and
    a plurality of fluid channels connected between the left and right output ports of the rotary valve and the left and right input ports of the front and rear wheel steering cases or between the left and right input ports of the front and rear wheel steering cases,
    wherein the plurality of fluid channels include: when the steering cylinders are provided on inner sides in relation to the left and right pivoting shafts in the steering cases and when the front and rear wheel steering cases are symmetrically provided,
    a first fluid channel having a right fluid channel connecting the right input port of the front steering case and the left input port of the rear wheel steering case and a left fluid channel connecting a left input port of a hydraulic cylinder of the front wheel steering case and the right input port of the rear wheel steering case;
a second fluid channel connecting the right output port of the rotary valve and the right fluid channel; and
a third fluid channel connecting the left output port of the rotary valve and the left fluid channel.

2. The industrial vehicle as claimed in claim 1, further comprising at least one solenoid valve for opening/closing a flow of the pressure oil from the rotary valve to the front and rear wheel steering cases.

3. The industrial vehicle as claimed in claim 1, further comprising a differential driving unit which is mounted to each wheel and has a driving hydraulic motor which differentially drives the left wheel and right wheel according to a load applied to the wheels.

4. The industrial vehicle as claimed in claim 1, further comprising an upper frame pivoting unit provided between the upper frame and the lower frame and rotating the upper frame in relation to the lower frame.

5. An industrial vehicle, comprising:
a lower frame on front and rear lower sides of which front and rear wheels are installed respectively, the front and rear wheels being composed of left and right wheels;
an upper frame having a cab with a steering wheel located on an upper portion thereof and coupled upside the lower frame;
steering cylinders, each provided with left and right input ports and a driving chain connected at opposite ends to opposite ends of a corresponding one of the steering cylinders for moving the driving chain left and right by means of a pressure oil supplied to the left and right input ports;
left and right sprockets driven by the driving chain;
front and rear wheel steering cases having left and right pivoting shafts, the left and right pivoting shafts being coupled to the left and right sprockets on upper portions thereof and to the left and right wheels on lower portions thereof to transmit driving force to the left and right wheels;
a rotary valve connected to a steering pump and a hydraulic tank, provided with left and right output ports and discharging pressure oil from the steering pump to the left and right input ports based on rotation of the steering wheel; and
a plurality of fluid channels connected between the left and right output ports of the rotary valve and the left and right input ports of the front and rear wheel steering cases or between the left and right input ports of the front and rear wheel steering cases,
wherein the plurality of fluid channels include: when the steering cylinder is provided on inner sides in relation to the left and right pivoting shafts in the steering cases and when the front and rear wheel steering cases are symmetrically provided,
a first fluid channel connecting one input port of the front steering case and one input port of the rear wheel steering case;
a second fluid channel connecting one output port of the rotary valve and the other input port of the front wheel steering case; and
a third fluid channel connecting the other output port of the rotary valve and the one input port of the rear wheel steering case.

6. The industrial vehicle as claimed in claim 5, further comprising a differential driving unit which is mounted to each wheel and has a driving hydraulic motor which differentially drives the left wheel and right wheel according to a load applied to the wheels.

7. An industrial vehicle, comprising:
a lower frame on front and rear lower sides of which front and rear wheels are installed respectively, the front and rear wheels being composed of left and right wheels;
an upper frame having a cab with a steering wheel located on an upper portion thereof and coupled upside the lower frame;
steering cylinders, each provided with left and right input ports and a driving chain connected at opposite ends to opposite ends of a corresponding one of the steering cylinders for moving the driving chain left and right by means of a pressure oil supplied to the left and right input ports;
left and right sprockets driven by the driving chain;
front and rear wheel steering cases having left and right pivoting shafts, the left and right pivoting shafts being coupled to the left and right sprockets on upper portions thereof and to the left and right wheels on lower portions thereof to transmit driving force to the left and right wheels;
a rotary valve connected to a steering pump and a hydraulic tank, provided with left and right output ports and discharging pressure oil from the steering pump to the left and right input ports based on rotation of the steering wheel;
a plurality of fluid channels connected between the left and right output ports of the rotary valve and the left and right input ports of the front and rear wheel steering cases or between the left and right input ports of the front and rear wheel steering cases; and
a differential driving unit which is mounted to each wheel and has a driving hydraulic motor which differentially drives the left wheel and right wheel according to a load applied to the wheels,
wherein the differential driving unit includes:
left and right wheels installed on left and right of the wheels;
left and right driving hydraulic motors connected in parallel to the driving pump and driving the left and right wheels; and
a gear case mounted a reduction gear train connecting the left and right wheels and the left and right driving hydraulic motors and coupled to the pivoting shafts,
wherein a flow rate distributed from the driving pump to the left and right driving hydraulic motors according to a load applied to the left and right wheels to differentially drive the left and right wheels.

8. An industrial vehicle, comprising:
a lower frame on front and rear lower sides of which front and rear wheels are installed respectively, the front and rear wheels being composed of left and right wheels;
an upper frame having a cab with a steering wheel located on an upper portion thereof and coupled upside the lower frame;
steering cylinders, each provided with left and right input ports and a driving chain connected at opposite ends to opposite ends of a corresponding one of the steering cylinders for moving the driving chain left and right by means of a pressure oil supplied to the left and right input ports;
left and right sprockets driven by the driving chain;
front and rear wheel steering cases having left and right pivoting shafts, the left and right pivoting shafts being coupled to the left and right sprockets on upper portions thereof and to the left and right wheels on lower portions thereof to transmit driving force to the left and right wheels;

a rotary valve connected to a steering pump and a hydraulic tank, provided with left and right output ports and discharging pressure oil from the steering pump to the left and right input ports based on rotation of the steering wheel;

a plurality of fluid channels connected between the left and right output ports of the rotary valve and the left and right input ports of the front and rear wheel steering cases or between the left and right input ports of the front and rear wheel steering cases; and an upper frame pivoting unit provided between the upper frame and the lower frame and rotating the upper frame in relation to the lower frame.

9. An industrial vehicle, comprising:

a lower frame on front and rear lower sides of which front and rear wheels are installed respectively, the front and rear wheels being composed of left and right wheels;

an upper frame having a cab with a steering wheel located on an upper portion thereof and coupled upside the lower frame;

steering cylinders, each provided with left and right input ports and a driving chain connected at opposite ends to opposite ends of a corresponding one of the steering cylinders for moving the driving chain left and right by means of a pressure oil supplied to the left and right input ports;

left and right sprockets driven by the driving chain;

front and rear wheel steering cases having left and right pivoting shafts, the left and right pivoting shafts being coupled to the left and right sprockets on upper portions thereof and to the left and right wheels on lower portions thereof to transmit driving force to the left and right wheels;

a rotary valve connected to a steering pump and a hydraulic tank, provided with left and right output ports and discharging pressure oil from the steering pump to the left and right input ports based on rotation of the steering wheel;

a plurality of fluid channels connected between the left and right output ports of the rotary valve and the left and right input ports of the front and rear wheel steering cases or between the left and right input ports of the front and rear wheel steering cases;

at least one solenoid valve for opening/closing a flow of the pressure oil from the rotary valve to the front and rear wheel steering cases; and a limit valve for switching the solenoid valve so as to supply the pressure oil from the front wheel steering case to the rear wheel steering case.

10. An industrial vehicle, comprising:

a lower frame on front and rear lower sides of which front and rear wheels are installed respectively, the front and rear wheels being composed of left and right wheels;

an upper frame having a cab with a steering wheel located on an upper portion thereof and coupled upside the lower frame;

steering cylinders, each provided with left and right input ports and a driving chain connected at opposite ends to opposite ends of a corresponding one of the steering cylinders for moving the driving chain left and right by means of a pressure oil supplied to the left and right input ports;

left and right sprockets driven by the driving chain;

front and rear wheel steering cases having left and right pivoting shafts, the left and right pivoting shafts being coupled to the left and right sprockets on upper portions thereof and to the left and right wheels on lower portions thereof to transmit driving force to the left and right wheels;

a rotary valve connected to a steering pump and a hydraulic tank, provided with left and right output ports and discharging pressure oil from the steering pump to the left and right input ports based on rotation of the steering wheel;

a plurality of fluid channels connected between the left and right output ports of the rotary valve and the left and right input ports of the front and rear wheel steering cases or between the left and right input ports of the front and rear wheel steering cases;

a solenoid valve for opening/closing a flow of the pressure oil from the rotary valve to the rear wheel steering case;

an upper frame pivoting unit provided between the upper frame and the lower frame and rotating the upper frame in relation to the lower frame; and a direction switching valve provided between the rotary valve and the front wheel steering case so as to move the wheels in the same direction as a rotational direction of the steering wheel when the upper frame is pivoted about the pivoting unit in relation to the lower frame to be aligned in a direction opposite to the lower frame and then the steering wheel is rotated, and switching a direction of the pressure oil discharged from the left and right output ports of the rotary valve to the left and right input ports of the front wheel steering case.

11. The industrial vehicle as claimed in claim 10, wherein the plurality of fluid channels include: when the steering cylinders are provided on inner sides in relation to the left and right pivoting shafts in the steering cases and when the front and rear wheel steering cases are symmetrically provided, a first fluid channel having a right fluid channel connecting the right input port of the front steering case and the left input port of the rear wheel steering case and a left fluid channel connecting a left input port of a hydraulic cylinder of the front wheel steering case and the right input port of the rear wheel steering case;

a second fluid channel connecting the right output port of the rotary valve and the right fluid channel; and a third fluid channel connecting the left output port of the rotary valve and the left fluid channel.

12. An industrial vehicle having:

a lower frame on front and rear lower sides of which front and rear wheels are installed respectively, the front and rear wheels being composed of left and right wheels;

an upper frame having a cab with a steering wheel located on an upper portion thereof and coupled upside the lower frame;

steering cylinders, each provided with left and right input ports and a driving chain connected at opposite ends to opposite ends of a corresponding one of the steering cylinders for moving the driving chain left and right by means of a pressure oil supplied to the left and right input ports;

left and right sprockets driven by the driving chain;

front and rear wheel steering cases having left and right pivoting shafts, the left and right pivoting shafts being coupled to the left and right sprockets on upper portions thereof and to the left and right wheels on lower portions thereof to transmit driving force to the left and right wheels;

a rotary valve connected to a steering pump and a hydraulic tank, provided with left and right output ports and discharging pressure oil from the steering pump to the left and right input ports based on rotation of the steering wheel;

a plurality of fluid channels connected between the left and right output ports of the rotary valve and the left and right input ports of the front and rear wheel steering cases or between the left and right input ports of the front and rear wheel steering cases;

a boom assembly connected to a rear arm having a rear end fixed pivotably in rear of the upper frame, said boom assembly comprising:

a first main arm having a rear end fixed pivotably on a front end of the rear arm;

a second main arm slidably coupled on a front end of the first main arm and having a working tool bracket and the working tool fixed rotatably on a front end thereof;

a boom length adjuster provided between the first and second main arms and moving the second main arm in relation to the first main arm;

a lifting actuator pivotably fixed to the upper frame in front of the rear arm on one end thereof and rotatably fixed in a middle portion of the first main arm on the other end thereof, to thus be telescoped to pivot the first main arm;

a control link pivotably fixed in front of the upper frame on one end thereof and rotatably fixed to the first main arm on the other end thereof; and a working tool actuator fixed to the second main arm on one end thereof and pivotably fixed to the working tool bracket to rotate the working tool bracket.

13. The industrial vehicle as claimed in claim 12, wherein the boom length adjuster includes:

a chamber provided on an inner side of the front end of the first main arm in a longitudinal direction;

a first flange provided on an outer circumferential edge on the front end of the first main arm;

a telescopic actuator having a rear end fixed in the chamber and the other end fixed on a rear end of said second main arm, and provided in the chamber to move the second main arm inserted into the chamber; and a second flange provided outside the second main arm so as to come into contact with the first flange with the telescopic actuator contracted.

* * * * *